United States Patent
Yasumoto

(10) Patent No.: US 9,351,180 B2
(45) Date of Patent: May 24, 2016

(54) COMMUNICATION SYSTEM, WIRELESS COMMUNICATION APPARATUS AND STATE INFORMATION RECEIVING APPARATUS

(71) Applicant: FUJITSU LIMITED, Kawasaki-shi (JP)

(72) Inventor: Tomonori Yasumoto, Kokubunji (JP)

(73) Assignee: FUJITSU LIMITED, Kawasaki (JP)

( * ) Notice: Subject to any disclaimer, the term of this patent is extended or adjusted under 35 U.S.C. 154(b) by 257 days.

(21) Appl. No.: 13/852,623

(22) Filed: Mar. 28, 2013

(65) Prior Publication Data

US 2013/0215735 A1     Aug. 22, 2013

Related U.S. Application Data

(63) Continuation of application No. PCT/JP2010/067143, filed on Sep. 30, 2010.

(51) Int. Cl.
*H04W 24/04* (2009.01)
*H04W 24/08* (2009.01)
(Continued)

(52) U.S. Cl.
CPC ............ *H04W 24/04* (2013.01); *H04W 24/08* (2013.01); *H04W 28/04* (2013.01); *H04W 84/12* (2013.01)

(58) Field of Classification Search
CPC ..... H04W 24/00; H04W 24/04; H04W 24/08; H04W 28/04; H04W 84/12
USPC .......................................................... 370/315
See application file for complete search history.

(56) References Cited

U.S. PATENT DOCUMENTS

| | | | | |
|---|---|---|---|---|
| 2007/0168326 | A1* | 7/2007 | Das .................... | H04L 1/0006 |
| 2009/0191877 | A1* | 7/2009 | Jang ..................... | H04W 16/14 |
| | | | | 455/438 |
| 2010/0267378 | A1* | 10/2010 | Hamabe .............. | H04W 24/10 |
| | | | | 455/423 |

FOREIGN PATENT DOCUMENTS

| JP | 11-122670 | 4/1999 |
|---|---|---|
| JP | 2002-016539 | 1/2002 |

(Continued)

OTHER PUBLICATIONS

JPOA—Notice of Reason for Rejection dated May 20, 2014 with its English translation issued in the corresponding Japanese application No. 2012-536092.

(Continued)

*Primary Examiner* — Andrew Lai
*Assistant Examiner* — Sumitra Ganguly
(74) *Attorney, Agent, or Firm* — Fujitsu Patent Center

(57) ABSTRACT

A communication system includes a wireless communication apparatus which comprises a wireless communication unit performing wireless communication with a designated wireless apparatus as a communication correspondent; a state storing unit storing state information which indicates a communication state at each point of time in the wireless communication; a failure determination unit using a predetermined determination criterion to determine at each stage of the wireless communication whether or not a communication failure occurs in the wireless communication; a state acquisition unit acquiring from the state storing unit, when it is determined that a communication failure occurs, state information which indicates a communication state at each point of time during a predetermined time period; and a state sending unit sending via wireless communication the state information to a communication correspondent other than the designated wireless apparatus; and a state information receiving apparatus receiving the state information.

8 Claims, 18 Drawing Sheets

(51) Int. Cl.
*H04W 28/04* (2009.01)
*H04W 84/12* (2009.01)

(56) References Cited

FOREIGN PATENT DOCUMENTS

| | | |
|---|---|---|
| JP | 2002-271833 | 9/2002 |
| JP | 2004-120072 | 4/2004 |
| JP | 2007-027931 | 2/2007 |
| JP | 2007-088811 | 4/2007 |
| JP | 2009-177731 | 8/2009 |
| JP | 2009-528710 | 8/2009 |
| JP | 2009-200668 | 9/2009 |
| WO | WO-2007/075744 | 7/2007 |

OTHER PUBLICATIONS

International Search Report, mailed in connection with PCT/JP2010/067143 and mailed Dec. 14, 2010.
JPOA—Notice of Reason for Rejection dated Jan. 20, 2015 issued in the corresponding Japanese application No. 2012-536092, with partial English translation.
Notification of Transmittal of Translation of The International Preliminary Report on Patentability (Form PCT/IB/338), International Application No. PCT/JP2010/067143, 8 pages, dated Apr. 18, 2013.

\* cited by examiner

FIG. 17 Tb

| TIME | RECEPTION SENSITIVITY | THROUGHPUT VALUE | SSID | BSSID | ANALYZING SERVER →OPERATION SERVER ping RESPONSE RESULT |
|---|---|---|---|---|---|
| T-4.0[s] | -20dBm | 20.3Mbps | ABC | XXXXXX-XXXXXX | Reply <OK> |
| T-3.0[s] | -21dBm | 20.9Mbps | ABC | XXXXXX-XXXXXX | Reply <OK> |
| T-2.0[s] | -20dBm | 19.4Mbps | ABC | XXXXXX-XXXXXX | Reply <OK> |
| T-1.0[s] | -19dBm | 19.6Mbps | ABC | XXXXXX-XXXXXX | Reply <OK> |
| T | -59dBm | 0Mbps | ABC | YYYYYY-YYYYYY | Reply <OK> |
| T+1.0[s] | -60dBm | 0.01Mbps | ABC | YYYYYY-YYYYYY | Reply <OK> |
| T+2.0[2] | -61dBm | 0.02Mbps | ABC | YYYYYY-YYYYYY | Reply <OK> |

FIG. 18 Tb

| TIME | RECEPTION SENSITIVITY | THROUGHPUT VALUE | SSID | BSSID | ANALYZING SERVER →OPERATION SERVER ping RESPONSE RESULT |
|---|---|---|---|---|---|
| T-4.0[s] | -20dBm | 12.3Mbps | ABC | XXXXXX-XXXXXX | Reply <OK> |
| T-3.0[s] | -21dBm | 10.9Mbps | ABC | XXXXXX-XXXXXX | Reply <OK> |
| T-2.0[s] | -20dBm | 8.3Mbps | ABC | XXXXXX-XXXXXX | No Reply <NG> |
| T-1.0[s] | -19dBm | 7.6Mbps | ABC | XXXXXX-XXXXXX | Reply <OK> |
| T | -20dBm | 3.9Mbps | ABC | YYYYYY-YYYYYY | No Reply <NG> |
| T+1.0[s] | -18dBm | 2.0Mbps | ABC | YYYYYY-YYYYYY | Reply <OK> |
| T+2.0[2] | -19dBm | 1.0Mbps | ABC | YYYYYY-YYYYYY | No Reply <NG> |

# COMMUNICATION SYSTEM, WIRELESS COMMUNICATION APPARATUS AND STATE INFORMATION RECEIVING APPARATUS

CROSS-REFERENCE TO RELATED APPLICATION

This application is a continuation application of International Application PCT/JP2010/067143 filed on Sep. 30, 2010, the entire contents of which are incorporated herein by reference.

FIELD

The embodiments relate to a communication system configured to perform wireless communication, a wireless communication apparatus, a state information receiving apparatus, a wireless communication program and a state information receiving program. Here, the term "wireless" includes a meaning of an antonym of "wired," and covers not only electric waves but also light, infrared and the like for instance.

BACKGROUND

LAN (Local Area Network) is widely prevalent in the offices and the like. Communications via LAN include communications via wired LAN, in which information is exchanged through wired communication, and communications via wireless LAN, in which information is exchanged through wireless communication.

Communications via wireless LAN have the advantage over wired LAN of offering greater flexibility in regard of service spaces for terminals during communication, and is widely prevalent (for example, see Patent document 1).
[Patent document 1]
Japanese Laid-Open Patent Publication No. 2007-27931

SUMMARY

Here, in communications via wireless LAN, electric waves as communication media are subject to influences from the environments of transmission routes and the environments themselves are not stabilized, communication failures tend to occur in comparison with communications via wired LAN, in which communications are achieved using communication lines.

In case that a communication failure occurs in communications via wireless LAN, it is required to identify the cause of the failure.

For this purpose, state information which indicates communication states such as reception sensitivity and throughput and the like at the time of communication is generally used, for example.

When identifying the cause of the failure, in most cases, a maintenance agent who receives a notification of the failure brings maintenance tools and heads over to the site where the failure occurs.

And then, the maintenance agent performs processes for acquiring the state information and the like.

However, since the environments of transmission routes are not stabilized as described above, the environments may have been changed when the maintenance agent arrives at the site.

Therefore, it may not be easy to acquire the state information which is useful for identifying the cause of the failure.

Communication via wireless LAN is given as an example to describe that it may not be easy to acquire state information which is useful for identifying the cause of the communication failure.

However, the same is true of not only communication in which electric waves are used as communication media like wireless LAN but also general wireless communication in which light and infrared and the like are used as communication media.

According to one aspect of the embodiments, a communication system includes a wireless communication apparatus and a state information receiving apparatus.

The wireless communication apparatus includes a wireless communication unit, a state storing unit, a failure determination unit, a state acquisition unit and a state sending unit.

The wireless communication unit performs wireless communication with a designated wireless apparatus as a communication correspondent.

The state storing unit stores state information which indicates a communication state at each point of time in the wireless communication performed by the wireless communication unit.

The failure determination unit uses a predetermined determination criterion to determine at each stage of the wireless communication whether or not a communication failure occurs in the wireless communication performed by the wireless communication unit.

The state acquisition unit acquires from the state storing unit, when the failure determination unit determines that a communication failure occurs, state information which indicates a communication state at each point of time during a predetermined time period which includes a point of time of the communication which is subject to the determination.

The state sending unit sends via wireless communication the state information acquired by the state acquisition unit to at least one communication correspondent which includes a communication correspondent other than the designated wireless apparatus.

The state information receiving apparatus receives the state information sent from the state sending unit via wireless communication.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

FIG. 17 is a diagram a table of an example of an analysis result in an analysis processing unit in FIG. 12.

FIG. 18 is a diagram illustrating a table of another example which is different from that in FIG. 17 of an analysis result in an analysis processing unit in FIG. 12.

DESCRIPTION OF EMBODIMENTS

Prior to explanations for specific embodiments of a communication system, a wireless communication apparatus, a state information receiving apparatus, a wireless communication program and a state information receiving program, a comparative example is explained below for comparing with the specific embodiments of the communication system.

Figure 1:
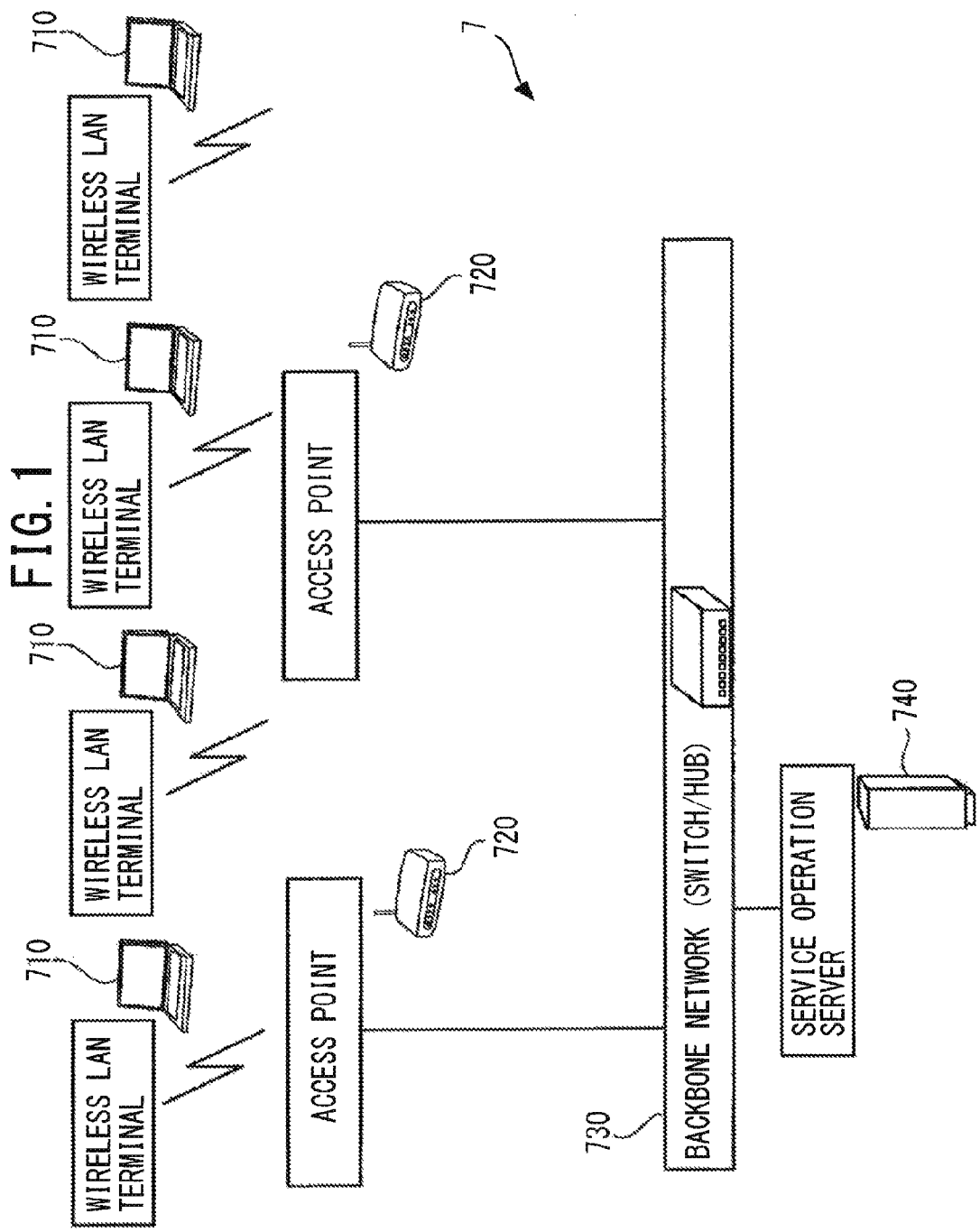
FIG. 1 is a schematic diagram illustrating a communication system in a comparative example.

FIG. 1 is a schematic diagram illustrating a communication system in the comparative example.

The communication system 7 in the comparative example in FIG. 1 is a wireless LAN system which includes plural wireless LAN terminals 710, plural access points 720, a backbone network 730 and a service operation server 740.

Wireless LAN terminal 710 is a notebook personal computer (note PC) equipped with a wireless communication function. Access point 720 is connected with backbone network 730 by wired connection. Access point 720 is an apparatus configured to connect backbone network 730 with each wireless LAN terminal 710 via wireless communication between wireless LAN terminals 710. Backbone network 730 is a wired network in which various network devices such as a router, a hub and the like are connected by wired connection via LAN cables. Service operation server 740 is incorporated into backbone network 730 by wired connection. Service operation server 740 is a server which controls the entire communication performed in communication system 7 in the comparative example.

Communication system 7 in the comparative example is a so-called infrastructure mode communication system, in which wireless LAN terminals perform wireless communications through access points 720.

At the time of communication in communication system 7 in the comparative example, communication packets, in which information is packetized, are sent from wireless LAN terminals 710 via wireless communication. In this case, wireless LAN terminal 710 as a sender sets another wireless LAN terminal 710 as a receiving side of communication packets and sets a nearest access point 720 as a direct communication correspondent of wireless communication. Then, the communication packets are received by a nearest access point 720 which is set as a communication correspondent. The received communication packets are sent to the nearest access point 720 of wireless LAN terminal 710 as the receiving side under control of service operation server 740. And then, the communication packets are sent via wireless communication from access point 720 to wireless LAN terminal 710 as the receiving side. In communication system 7 in the comparative example, wireless communications between terminals are achieved by performing a series of processes as described above.

In the communications in communication system 7 in the comparative example, the communications between wireless LAN terminals 710 and nearest access points 720 are performed using electric waves as communication media as described above.

Here, electric waves are generally easily affected by the environments of the transmission routes, and further the environments themselves are not stabilized. Thus, in the communications in a wireless LAN system such as communication system 7 in the comparative example, communication failures occur more frequently than in the communications using wired LAN in which communications are performed via LAN cables.

When a communication failure occurs in the communications in a wireless LAN system, it is required to identify the cause of the failure. In order to identify the cause, state information which indicates communication states such as reception sensitivity, throughput and the like during the communications is generally used, for example.

For example, Sniffer (registered trademark) for monitoring communication packets sent on networks and Net Stumbler for searching wireless LAN areas are known as tools for acquiring information such as reception sensitivity and throughput and the like. When it is required to identify the causes of communication failures, a maintenance agent who receives a notification of the failure brings maintenance tools and heads over to the site where the failure occurs, and then performs the processes for acquiring the state information and the like.

Here, the information such as reception sensitivity and throughput at the time of communication failure is useful in order to identify the causes of communication failures.

However, since the environments of transmission routes are not stabilized, the communication states at the time of the communication failure may not be replicated when the maintenance agent receives the notifications and arrives at the site where the failure occur. Therefore, it may not be easy to acquire state information which is useful for identifying the cause of the failure.

On the other hand, tools for searching wireless LAN areas such as Net Stumbler may be installed in a wireless LAN terminal itself which performs wireless communications. Thus, it seems that when a tool for searching wireless LAN areas is installed in a wireless LAN terminal itself, the tool is activated immediately after a communication failure occurs and the state information may be acquired.

However, since such tools for searching wireless LAN areas operate while the normal wireless communication is suspended, the tool may not acquire the state information indicating the communication state at the time of the communication failure which is useful for identifying the cause of the failure.

Sniffer (registered trademark) may also be installed in a wireless LAN terminal itself. Further, Sniffer (registered trademark) may operate while communications are performed on the wireless LAN terminal. Therefore, it is theoretically possible that when Sniffer (registered trademark) is constantly activated, useful state information may be acquired. However, when Sniffer (registered trademark) is constantly activated in preparation of a communication failure, which may not be predicted, an unrealistic large storage capacity is used for storing a vast amount of information.

As described above, in wireless communications in a wireless LAN system such as communication system 7 in the comparative example, any techniques may not sufficiently achieve the aim for acquiring the state information which is useful for identifying the causes of communication failures.

Structures for acquiring the state information as described above are employed in the specific embodiments of a communication system, a wireless communication apparatus, a state information receiving apparatus, a wireless communication program and a state information receiving program as described below.

At first, explanations are given for a first embodiment of a communication system, a wireless communication apparatus, a state information receiving apparatus, a wireless communication program and a state information receiving program.

Figure 2:
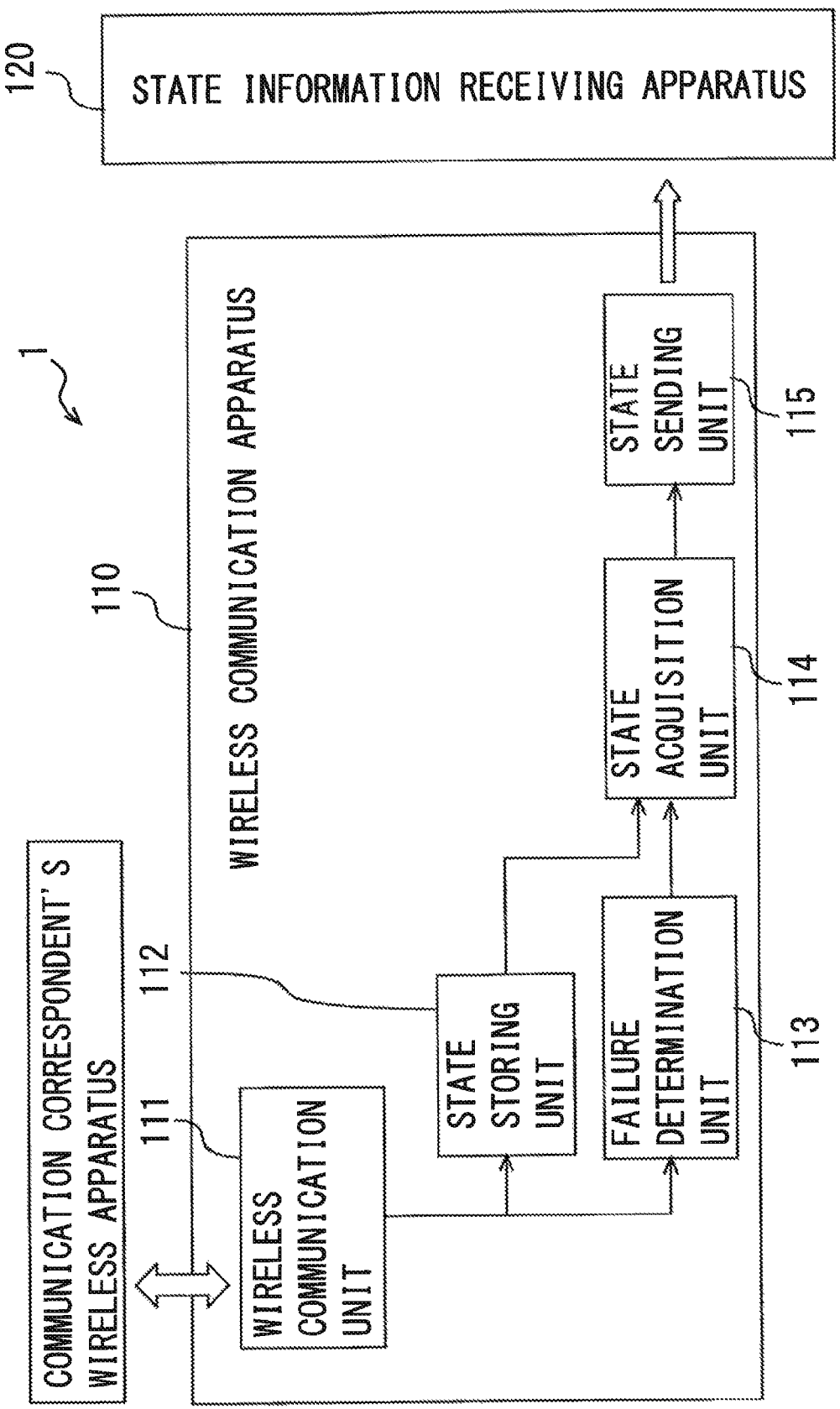
FIG. 2 is a functional block diagram illustrating a first embodiment of a communication system and a wireless communication apparatus.

FIG. 2 is a functional block diagram illustrating the first embodiment of a communication system and a wireless communication apparatus.

Communication system 1 in FIG. 2 as the first embodiment of the communication system includes a wireless communication apparatus 110 as a first embodiment of the wireless communication apparatus. In addition, communication system 1 includes a state information receiving apparatus 120.

Wireless communication apparatus 110 includes a wireless communication unit 111, a state memory unit 112, a failure determination unit 113, a state acquisition unit 114 and a state sending unit 115.

Wireless communication unit 111 performs wireless communication for a wireless apparatus designated as a communication correspondent.

State memory unit 112 stores state information which indicates a communication state at each stage of wireless communications performed by wireless communication unit 111.

Failure determination unit 113 uses a predetermined determination criterion to determine at each stage of the wireless communications whether or not a communication failure occurs in the wireless communications performed by wireless communication unit 111.

When failure determination unit 113 determines that a communication failure occurs, state acquisition unit 114 acquires from failure determination unit 113 state information which indicates a communication state at each stage during a predetermined time period which includes a point of time of communication which is subject to the determination.

State sending unit 115 sends the state information acquired by state acquisition unit 114 via wireless communication to at least one communication correspondent which includes a communication apparatus other than the above wireless communication apparatus.

State information receiving unit 120 receives the state information sent from state sending unit 115 via wireless communication.

In communication system 1, when a communication failure occurs, wireless communication apparatus 110 acquires state information which indicates a communication state at each stage during a time period which includes the point of time of the communication failure. Then, the state information is sent from wireless communication apparatus 110 via wireless communication. Further, the wireless communication may be received by a communication correspondent other than the wireless communication apparatus which is the communication correspondent at the time of the communication failure and may fail to receive the state information. That is, communication system 1 and wireless communication apparatus 110 include a structure in which any peripheral wireless communication apparatus of wireless communication apparatus 110 may acquire state information which is useful for identifying the causes of communication failures. Thus, the state information which is useful for identifying the causes of communication failures may be acquired in communication system 1 and wireless communication apparatus 110.

Figure 3:
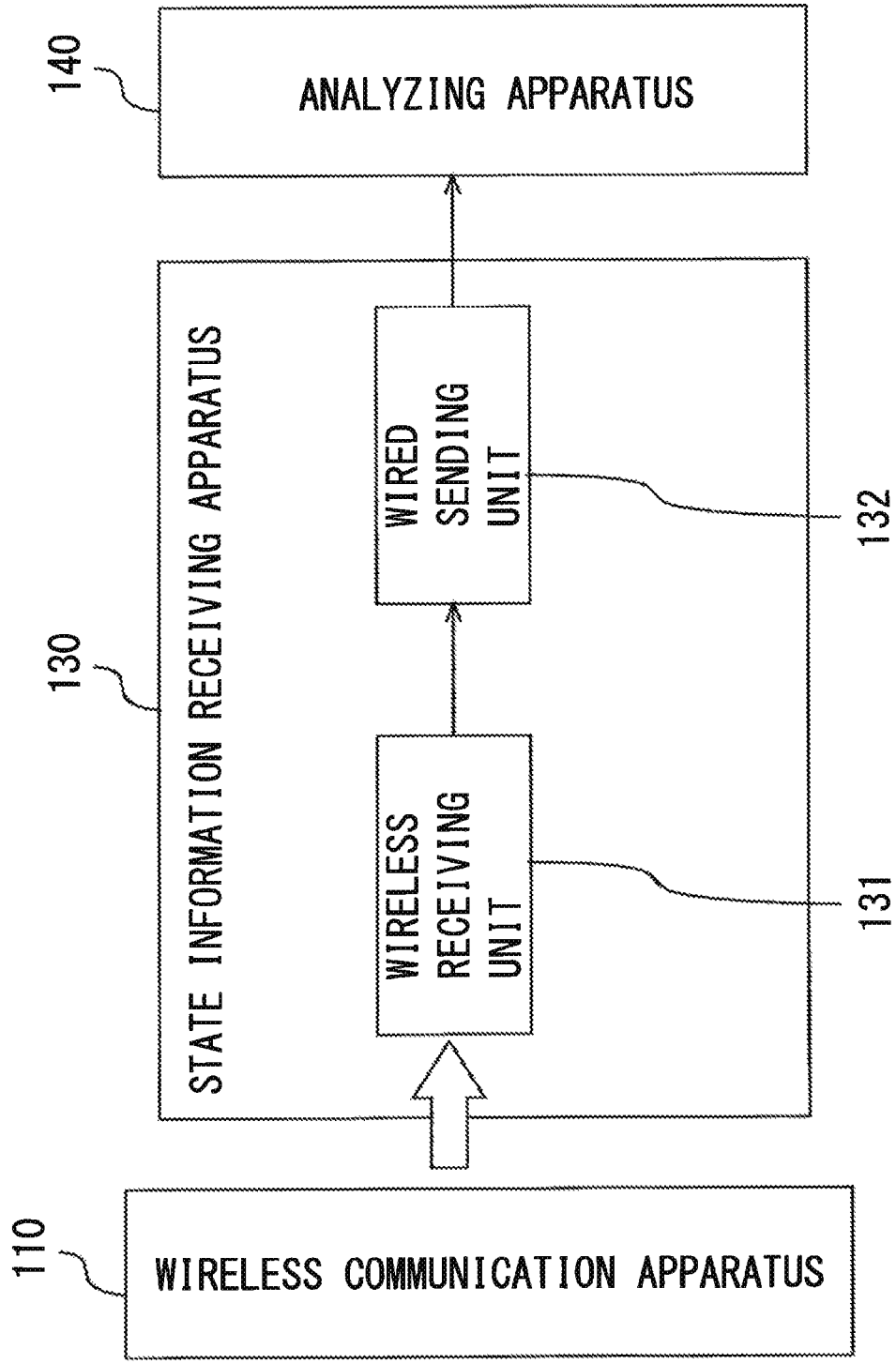
FIG. 3 is a functional block diagram illustrating a first embodiment of a state information receiving apparatus.

FIG. 3 is a functional block diagram illustrating a first embodiment of a state information receiving apparatus.

FIG. 3 illustrates wireless communication apparatus 110 as described above and an analyzing apparatus 140 for analyzing the above state information along with a state information receiving unit 130 as a first embodiment of the state information receiving apparatus.

State information receiving unit 130 includes a wireless receiving unit 131 and a wired sending unit 132.

Wireless receiving unit 131 receives state information sent from wireless communication apparatus 110 via wireless communication.

Wired sending unit 132 sends the state information received by wireless receiving unit 131 via wired communication. Further, wired sending unit 132 is connected with analyzing apparatus 140 as described below. Analyzing apparatus 140 receives and analyzes the state information sent from wired sending unit 132.

State information receiving apparatus 130 receives the state information sent from wireless communication apparatus 110 which indicates a communication state at each stage during a time period which includes the point of time of the communication failure. In addition, state information receiving apparatus 130 sends the state information to analyzing apparatus 140, which includes a function of analyzing the state information. Moreover, the state information is sent to analyzing apparatus 140 via wired communication, in which less communication failures may occur comparing to wireless communication. Thus, state information receiving apparatus 130 in FIG. 3 may be used to acquire and analyze the state information which is useful for identifying the causes of communication failures.

Figure 4:
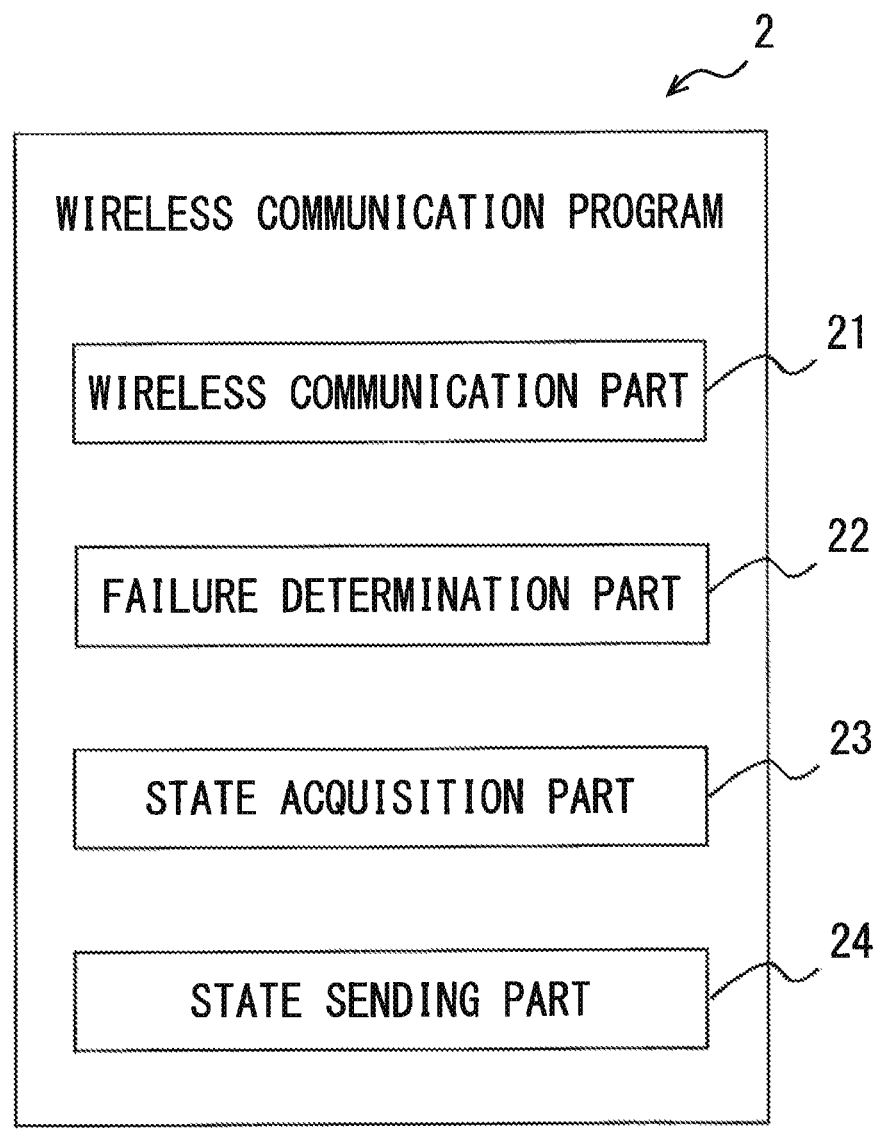
FIG. 4 is a diagram illustrating a first embodiment of a wireless communication program.

FIG. 4 is a diagram illustrating a first embodiment of a wireless communication program in the present embodiment.

Wireless communication program 2 in FIG. 4 is performed in a wireless communication apparatus which performs wireless communications. And the wireless communication apparatus is functioned as wireless communication apparatus 110 in FIG. 2 by wireless communication program 2. Wireless communication program 2 includes as program part a wireless communication part 21, a failure determination part 22, a state acquisition part 23 and a state sending part 24.

Wireless communication part 21 of wireless communication program 2 builds wireless communication unit 111 in wireless communication apparatus 110 in FIG. 2. And failure determination part 22 of wireless communication program 2 builds failure determination unit 113 in wireless communication apparatus 110 in FIG. 2. Further, state acquisition part 23 of wireless communication program 2 builds state acquisition unit 114 in wireless communication apparatus 110 in FIG. 2. Moreover, state sending part 24 of wireless communication program 2 builds state sending unit 115 in wireless communication apparatus 110 in FIG. 2.

With wireless communication program 2, the state information which is useful for identifying the causes of communication failures may be acquired and analyzed similar to wireless communication apparatus 110 in FIG. 2.

Figure 5:
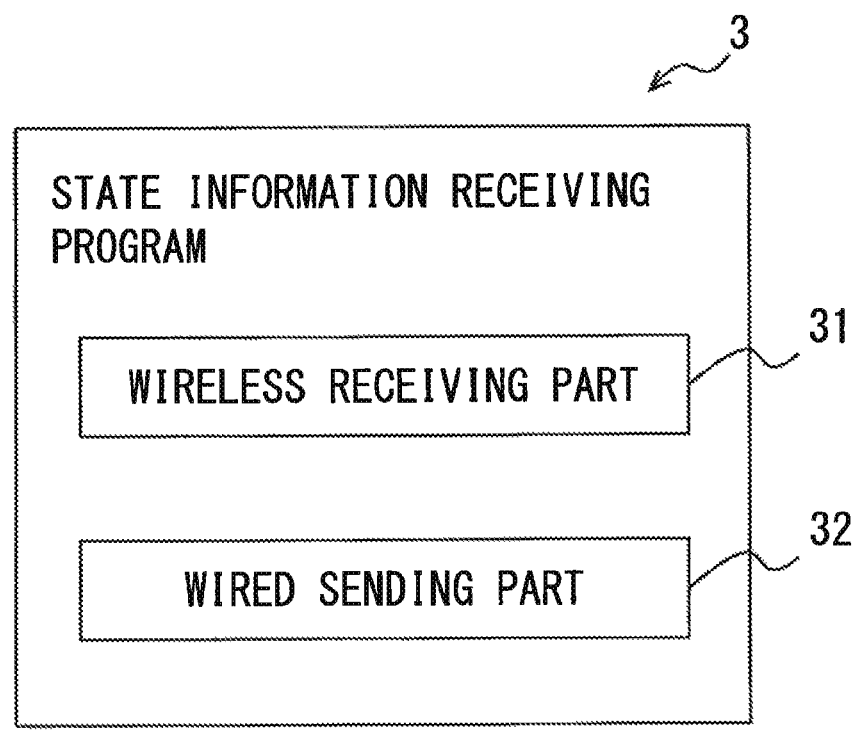
FIG. 5 is a diagram illustrating a first embodiment of a state information receiving program.

FIG. 5 is a diagram illustrating a first embodiment of a state information receiving program.

State information receiving program 3 in FIG. 5 is performed in a receiving apparatus which receives information sent via wireless communication. And the receiving apparatus is functioned as state information receiving apparatus 130 in FIG. 3 by state information receiving program 3. State information receiving program 3 includes as program part a wireless receiving part 31 and a wired sending part 32.

Wireless receiving part 31 of state information receiving program 3 builds wireless receiving unit 131 illustrated in FIG. 3. And wired sending part 32 of state information receiving program 3 builds wired sending unit 132 illustrated in FIG. 3.

With state information receiving program 3, the state information which is useful for identifying the causes of communication failures may be acquired and analyzed similar to state information receiving apparatus 130 illustrated in FIG. 3.

Next, explanations are given for a second embodiment of a communication system, a wireless communication apparatus, a state information receiving apparatus, a wireless communication program and a state information receiving program in the present embodiment.

Figure 6:
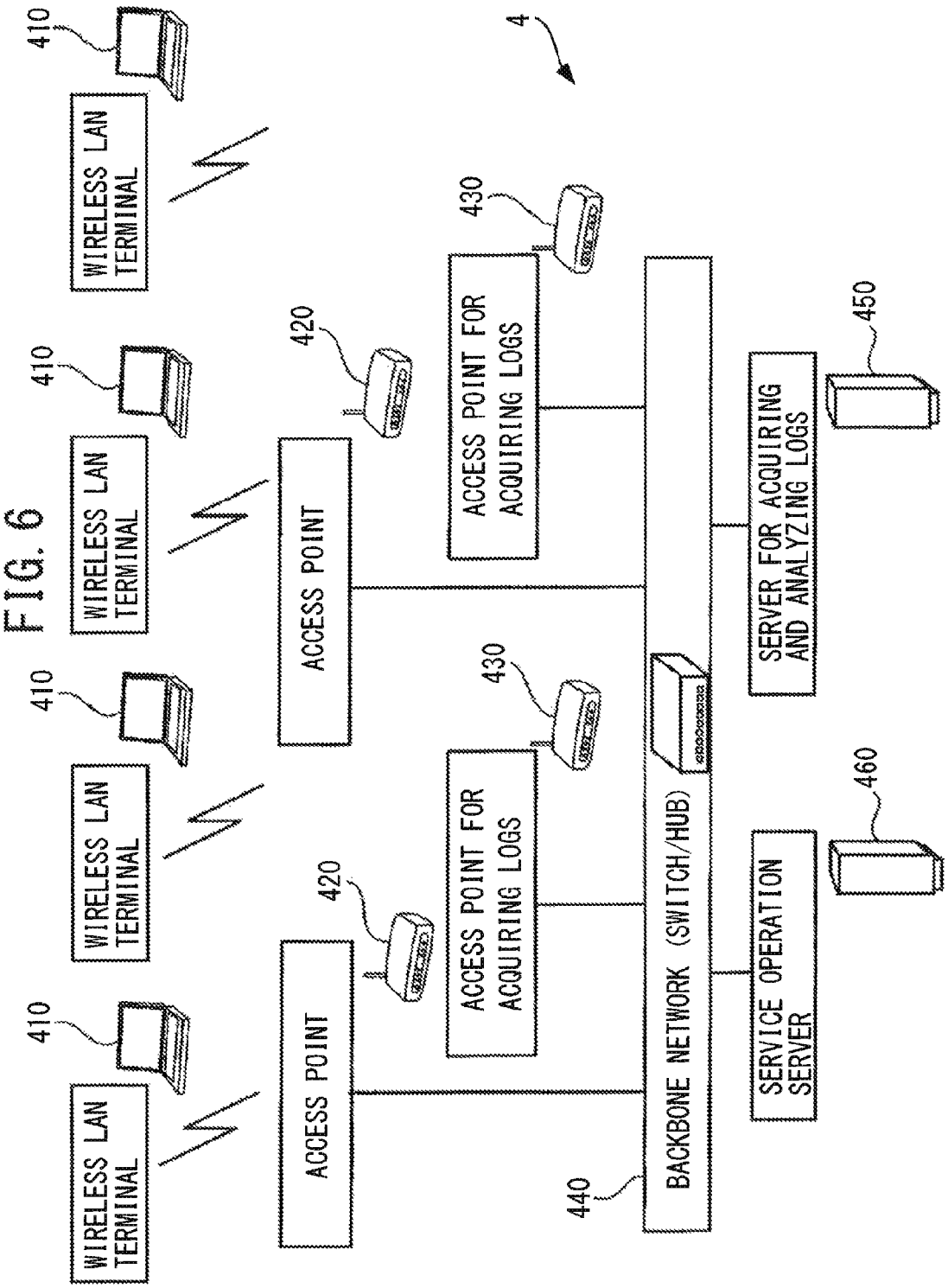
FIG. 6 is a schematic diagram illustrating a second embodiment of a communication system.

FIG. 6 is a schematic diagram illustrating a second embodiment of a communication system.

Communication system 4 in FIG. 6 is a wireless LAN system in the infrastructure mode as described above and includes the following elements. Communication system 4 includes plural wireless LAN terminals 410, plural access points 420 and plural access points for acquiring logs 430. Further, communication system 4 includes a backbone network 440, a server for acquiring and analyzing logs 450 and a service operation server 460.

Wireless LAN terminal 410 is a notebook personal computer (note PC) in which a wireless communication function is installed. In addition, wireless LAN terminal 410 includes a function of acquiring state information which is useful for identifying the causes of communication failures when communication failures occur. The state information which is useful for identifying the cause of a communication failure is referred to as failure information hereafter. The details of the failure information are described later. Further, wireless LAN terminal 410 includes a function of sending failure information to at least one communication correspondent which includes a wireless communication apparatus other than the wireless communication apparatus as communication correspondent at the time of the failure, via a communication scheme in which the at least one communication correspondent may receive the failure information. In this embodiment, as one example of the communication scheme, wireless LAN terminal 410 includes a function of sending information via wireless broadcast communication, which is a communication scheme for sending information to an unspecified number of communication correspondents in a network. Wireless LAN terminal 410 corresponds to a second embodiment of the wireless communication apparatus.

Here, the communication scheme in which at least one communication correspondent may receive information is not limited to the broadcast communication as described above. The communication system may include multicast communication, which is a communication system for sending the same information to plural designated communication correspondents in a network.

Access point 420, which is connected with backbone network 440 by wired connection, is an apparatus which connects backbone network 440 with each wireless LAN terminal 410 via wireless communication. Access point 420 is an access point dedicated for normal wireless communications. Access point 420 receives information, analyzes the type of the information and discards information such as failure information other than normal wireless information.

Similar to access point 420, access point for acquiring logs 430 includes a function of connecting backbone network 440 with each wireless LAN terminal 410. In addition, access point for acquiring logs 430 also includes a function of analyzing the type of the received information and sending, when the information is failure information, the failure information to server for acquiring and analyzing logs 450. Access point for acquiring logs 430 corresponds to a second embodiment of the state information receiving apparatus.

Backbone network 440 is a wired network in which various network devices such as router, hub and the like are connected by wired connection via LAN cables.

Server for acquiring and analyzing logs 450 is incorporated into backbone network 440 by wired connection. Server for acquiring and analyzing logs 450 analyzes the failure information sent from access points for acquiring logs 430 to identify the causes of failures as described later.

Service operation server 460 is incorporated into backbone network 440 by wired connection. Service operation server 460 is a server for controlling the entire communication in communication system 4.

Figure 7:
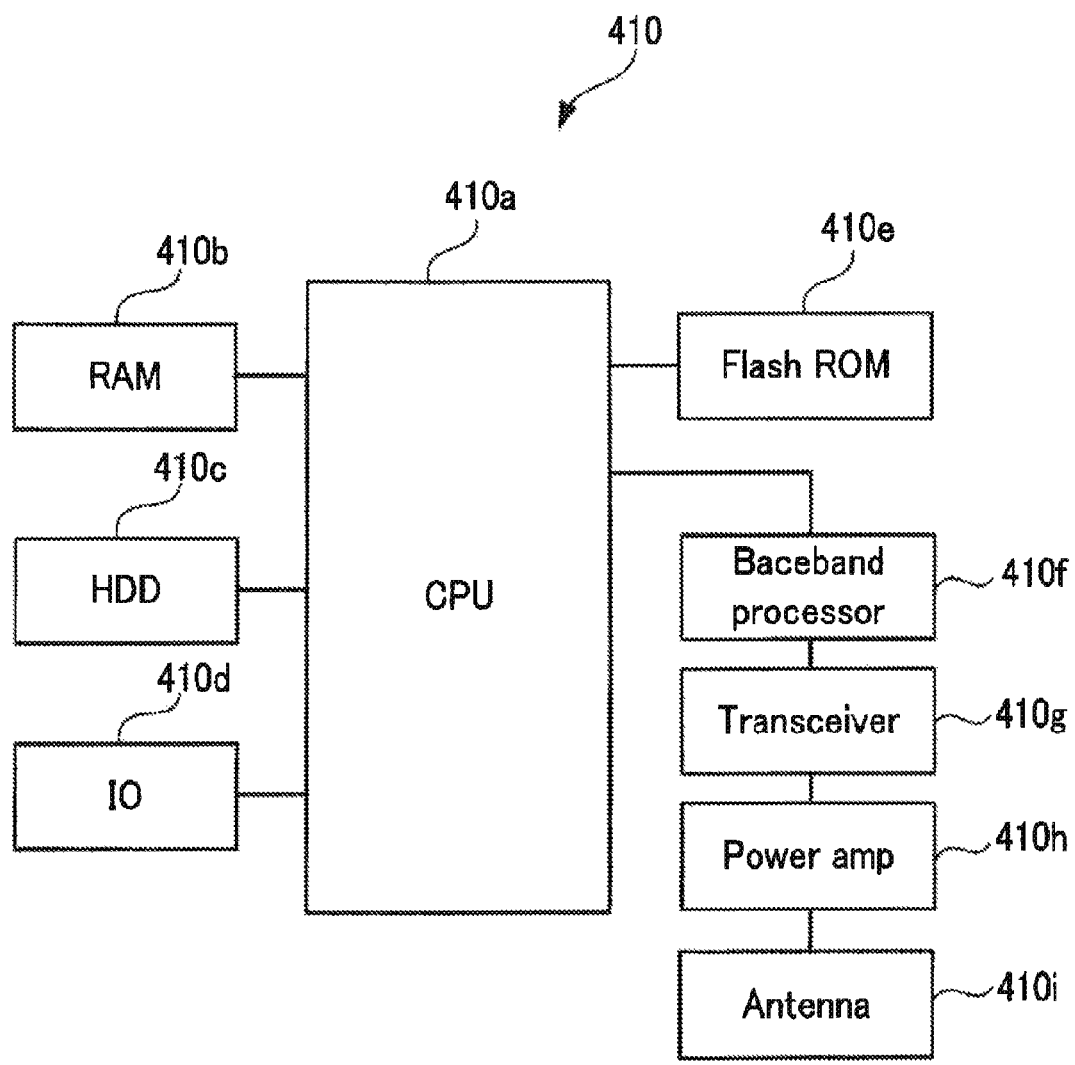
FIG. 7 is a hardware structure diagram illustrating the wireless LAN terminal in FIG. 6.

FIG. 7 is a hardware structure diagram illustrating the wireless LAN terminal in FIG. 6.

As illustrated in FIG. 7, wireless LAN terminal 410 includes a CPU (Central Processing Unit) 410*a* and a RAM (Random Access Memory) 410*b*. In addition, wireless LAN terminal 410 includes an HDD (Hard Disk Drive) 410*c*, an IO (Input Output) 410*d* and a flash ROM (Read Only Memory) 410*e*. Further, wireless LAN terminal 410 includes a baseband processor 410*f*, a transceiver 410*g*, a power amplifier 410*h* and an antenna 410*i*.

Here, as schematically illustrated in FIG. 6, wireless LAN terminal 410 is a note PC and includes a keyboard and a mouse for accepting information input by user interactions and a liquid crystal display for displaying a variety of information and the like in addition to the elements as described above. However, for the sake of convenience to explain wireless communications below, diagrams and explains for the keyboard, mouse, and liquid crystal display, which are not strongly related to wireless communication, are omitted here.

CPU 410*a* generally controls the operation of each element in wireless LAN terminal 410. RAM 410*b* is a memory for deploying execution programs and temporally storing a variety of control information and the like when the control processes are performed by CPU 410*a*. HDD 410*c* is a mass-storage apparatus for storing various programs and the like. IO 410*d* is an input-output interface for wireless LAN terminal 410 and the external apparatuses. Flash ROM 410*e* is a non-volatile memory for storing a variety of information and the like. Baseband processor 410*f* performs modulations of transmission signals and demodulations of received signals and the like when communications are performed via wireless LAN. Transceiver 410*g* sends and receives signals. Power amplifier 410*h* amplifies transmission signals and received signals. Antenna 410*i* sends and receives electric waves related to wireless communications.

In the present embodiment, a control program for communications via wireless LAN in wireless LAN terminal 410 is stored in HDD 410c. When communications are performed via wireless LAN, the wireless communication program is appropriately deployed in RAM 410b. Then, CPU 410a operates according to the wireless communication program to achieve wireless communications.

Next, explanations are given for access point 420 and access point for acquiring logs 430.

Here, in the present embodiment, access point 420 and access point for acquiring logs 430 employ a similar hardware structure.

Explanations are given below for the common hardware structure of access point 420 and access point for acquiring logs 430. The following explanations are concerned with access point for acquiring logs 430.

Figure 8:
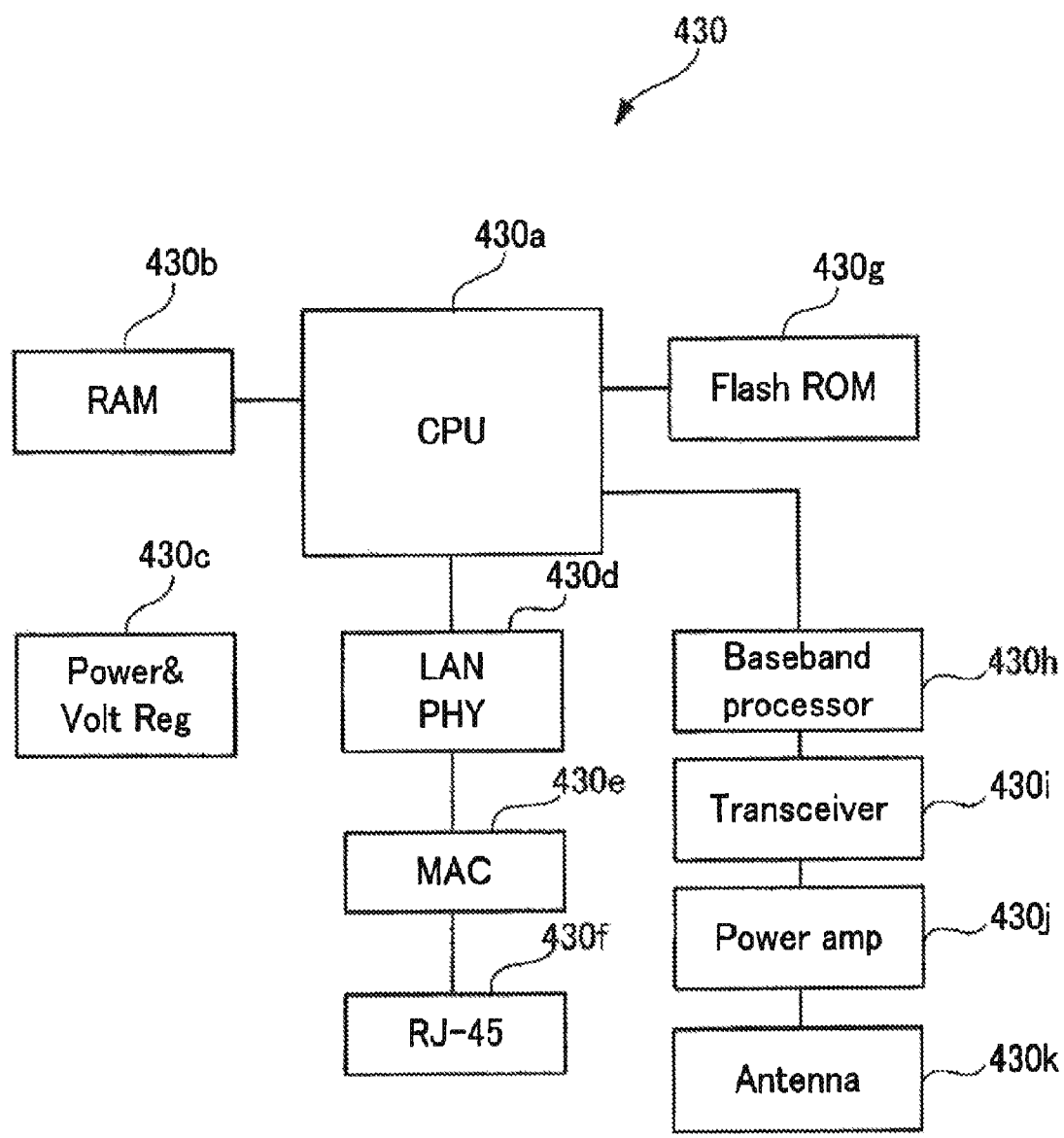
FIG. 8 is a hardware structure diagram illustrating the access point for acquiring logs in FIG. 6.

FIG. 8 is a hardware structure diagram illustrating the access point for acquiring logs in FIG. 6.

As illustrated in FIG. 8, access point for acquiring logs 430 includes a CPU 430a, a RAM 430b and a power supply circuit 430c. And access point for acquiring logs 430 includes a LAN PHY (Local Area Network Physical Layer) element 430d. In addition, access point for acquiring logs 430 includes a MAC (Media Access Control) element 430e. Further, access point for acquiring logs 430 includes an RJ-45 (Registered Jack-45) connector 430f. Moreover, access point for acquiring logs 430 includes a flash ROM 430g, a baseband processor 430h, a transceiver 430i, a power amplifier 430j and an antenna 430k.

CPU 430a generally controls operations of each element in access point for acquiring logs 430. RAM 430b is a memory for deploying execution programs and temporally storing a variety of control information and the like when the control processes are performed by CPU 430a. Power supply circuit 430c supplies power to each element in access point for acquiring logs 430. LAN PHY element 430d performs modulations of transmission signals and demodulations of received signals and the like. These signals are exchanged by wired connection through backbone network 440 in FIG. 6. MAC element 430e forms data frames and detects errors. RJ-45 connector 430f is a connector to which a LAN cable is connected in order to connect access point for acquiring logs 430 with backbone network 440 in FIG. 6. Flash ROM 430g is a non-volatile memory for storing various programs and the like. Baseband processor 430h performs modulations of transmission signals and demodulations of received signals and the like when communications are performed via wireless LAN. Transceiver 430i sends and receives signals. Power amplifier 430j amplifies transmission signals and received signals. Antenna 430k sends and receives electric waves related to wireless communications.

In the present embodiment, a control program for communications via wireless LAN is stored in a flash ROM in access point 420 and access point for acquiring logs 430. When communications are performed via wireless LAN, the wireless communication program is appropriately deployed in a RAM and a CPU operates according to the wireless communication program to achieve wireless communications.

Next, explanations are given for server for acquiring and analyzing logs 450 and service operation server 460 in FIG. 6.

Here, in the present embodiment, server for acquiring and analyzing logs 450 and service operation server 460 employ a similar hardware structure.

Explanations are given below for the common hardware structure of server for acquiring and analyzing logs 450 and service operation server 460. The following explanations are concerned with server for acquiring and analyzing logs 450.

Figure 9:
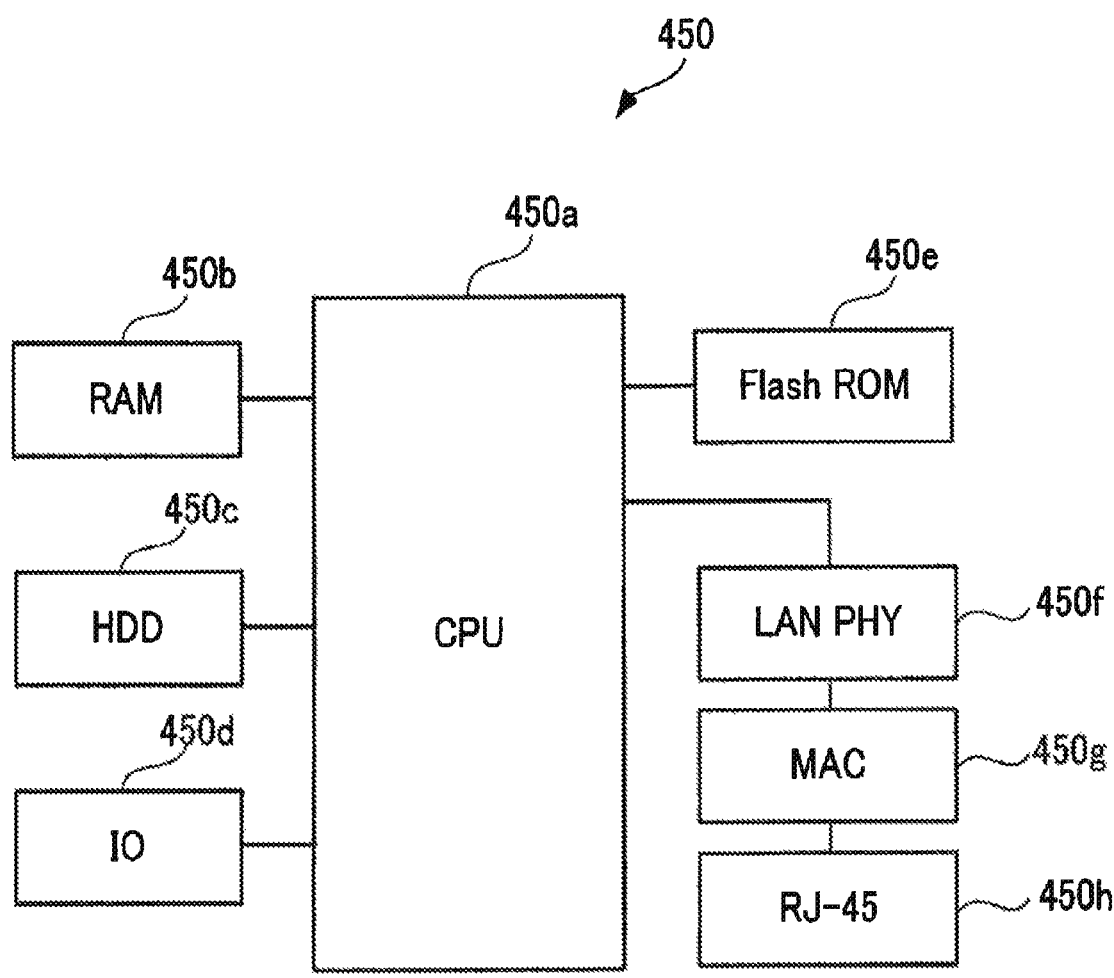
FIG. 9 is a hardware structure diagram illustrating the server for acquiring and analyzing logs in FIG. 6.

FIG. 9 is a hardware structure diagram illustrating the server for acquiring and analyzing logs in FIG. 6.

As illustrated in FIG. 9, server for acquiring and analyzing logs 450 includes a CPU 450a, a RAM 450b, an HDD 450c and an IO 450d. In addition, server for acquiring and analyzing logs 450 includes a flash ROM 450e, a LAN PHY element 450f, a MAC element 450g and an RJ-45 connector 450h.

CPU 450a generally controls operations of each element in server for acquiring and analyzing logs 450. RAM 450b is a memory for deploying execution programs and temporally storing a variety of control information and the like when the control processes are performed by CPU 450a. HDD is a mass-storage device for storing various programs. IO 450d is an input-output interface for server for acquiring and analyzing logs 450 and the external apparatuses. Flash ROM 450e is a non-volatile memory for storing a variety of information and the like. LAN PHY element 450f performs modulations of transmission signals and demodulations of received signals and the like. These signals are exchanged by wired connection through backbone network 440 in FIG. 6. MAC element 450g forms data frames and detects errors. RJ-45 connector 450h is a connector to which a LAN cable is connected in order to connect server for acquiring and analyzing logs 450 with backbone network 440 in FIG. 6.

In the present embodiment, server for acquiring and analyzing logs 450 analyzes failure information sent from access point for acquiring logs 430 as described below according to processes performed by CPU 450a. Analysis results and the like are stored in HDD 450c. Further, service operation server 460 performs various control processes related to wireless communications in the wireless LAN system in FIG. 6 according to processes performed by the CPU.

Here, in the present embodiments, a function of acquiring and sending failure information via broadcast communication is incorporated into the wireless communication program for allowing wireless LAN terminal 410 to perform wireless communications.

Figure 10:
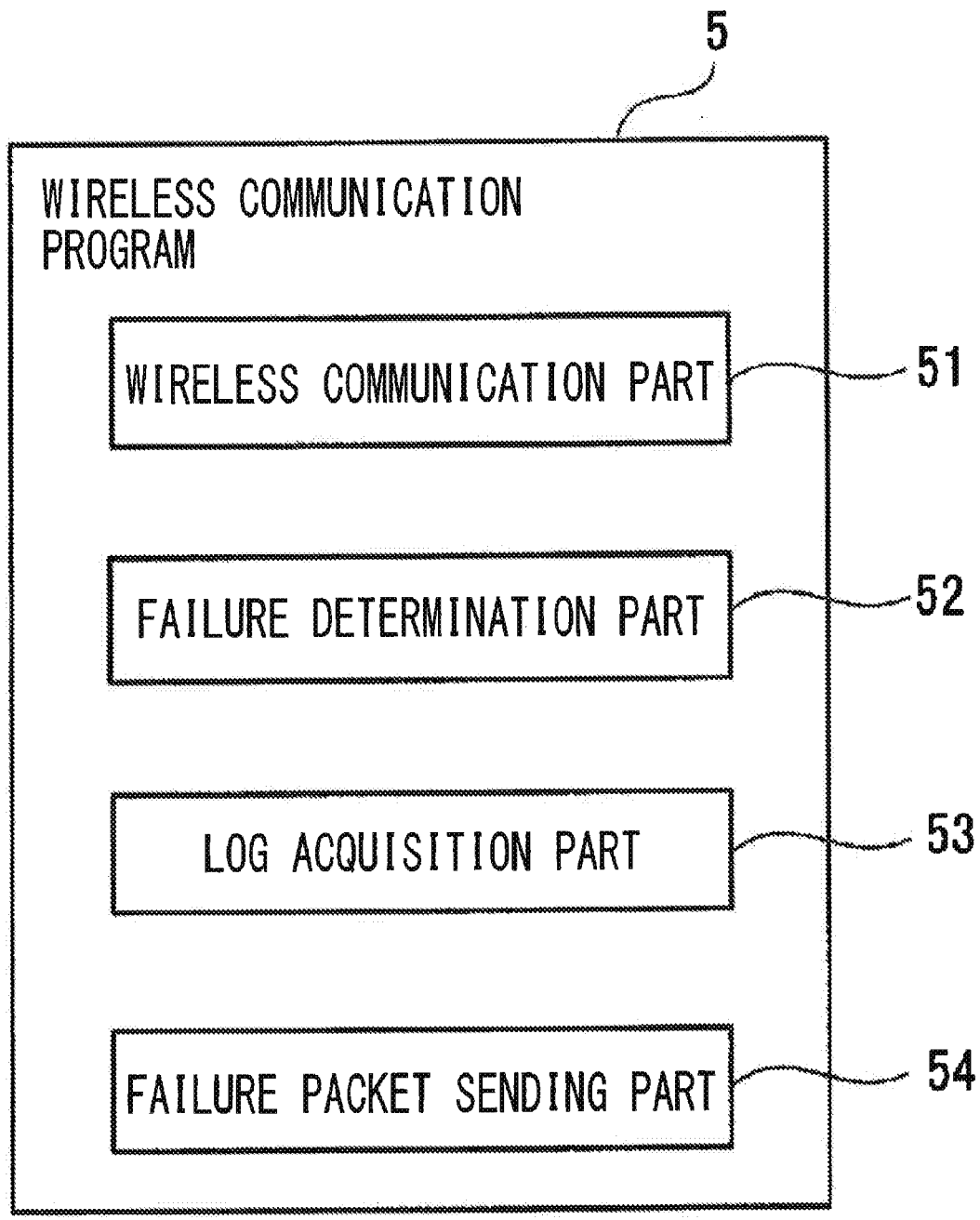
FIG. 10 is a conceptual diagram illustrating a wireless communication program for allowing a wireless LAN terminal to perform wireless communications.

FIG. 10 is a conceptual diagram illustrating a wireless communication program for allowing wireless LAN terminals to perform wireless communications.

Wireless communication program 5 illustrated in FIG. 10 corresponds to a second embodiment of the wireless communication program.

Wireless communication program 5 is stored in HDD 410c illustrated in FIG. 7 as described above.

Wireless communication program 5 includes the following program parts which build in wireless LAN terminal 410 functional blocks for acquiring state information which is useful for identifying the causes of communication failures.

That is, wireless communication program 5 includes a wireless communication part 51, a failure determination part 52, a log acquisition part 53 and a failure packet sending part 54. Each program part is described later.

In addition, flash ROM 430g in access point for acquiring logs 430 stores not only general functions of an access point but also a program for access point for acquiring logs which builds the following functions.

Although the details are described later, when a communication failure occurs in communications via wireless LAN, wireless LAN terminal 410 sends a failure packet in which failure information regarding the communication failure is packetized. The program for access point for acquiring logs is a program which builds not only functions of a general access point but also functions of receiving the failure packet and sending the failure packet to server for acquiring and analyzing logs 450 in FIG. 6.

In addition, flash ROMs in access points 420 in FIG. 6 store programs which build functions of a general access point. However, since the programs are well known in the field of wireless LAN, drawings and explanations are omitted here.

Figure 11:
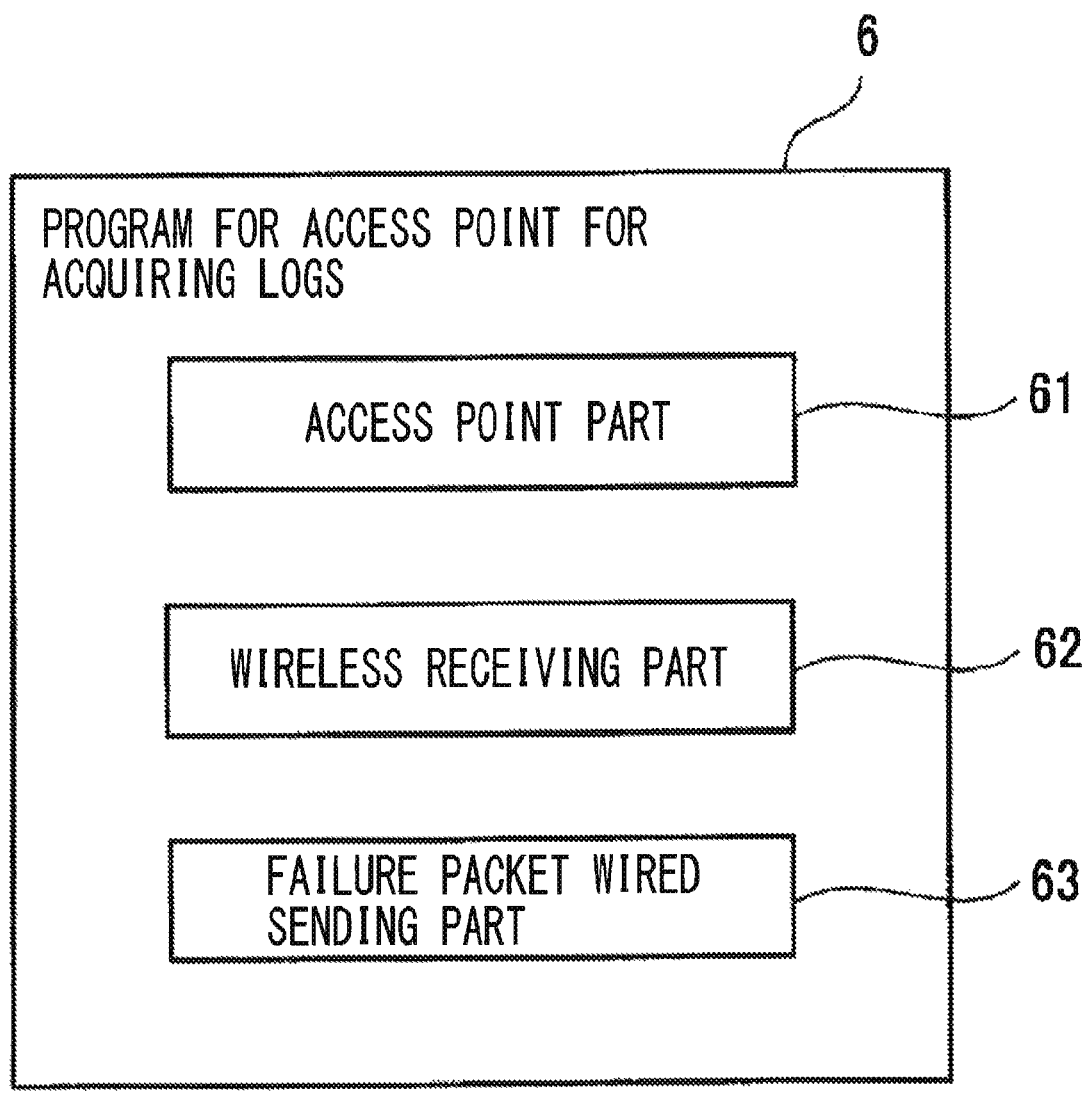
FIG. 11 is a conceptual diagram illustrating a program for access point for acquiring logs which is stored in a flash ROM of an access point for acquiring logs.

FIG. 11 is a conceptual diagram illustrating a program for access point for acquiring logs which is stored in a flash ROM of an access point for acquiring logs.

Program for access point for acquiring logs 6 in FIG. 11 corresponds to a second embodiment of the information receiving program.

Program for access point for acquiring logs 6 includes an access point part 61, a wireless receiving part 62 and a failure packet wired sending part 63. Each program part is described later.

In communication system 4 in FIG. 6, wireless LAN terminals 410 perform wireless programs 5 in FIG. 10 and access points for acquiring logs 430 perform programs for access point for acquiring logs 6. Thus, functional blocks for acquiring, sending and receiving failure information are built in communication system 4.

Figure 12:
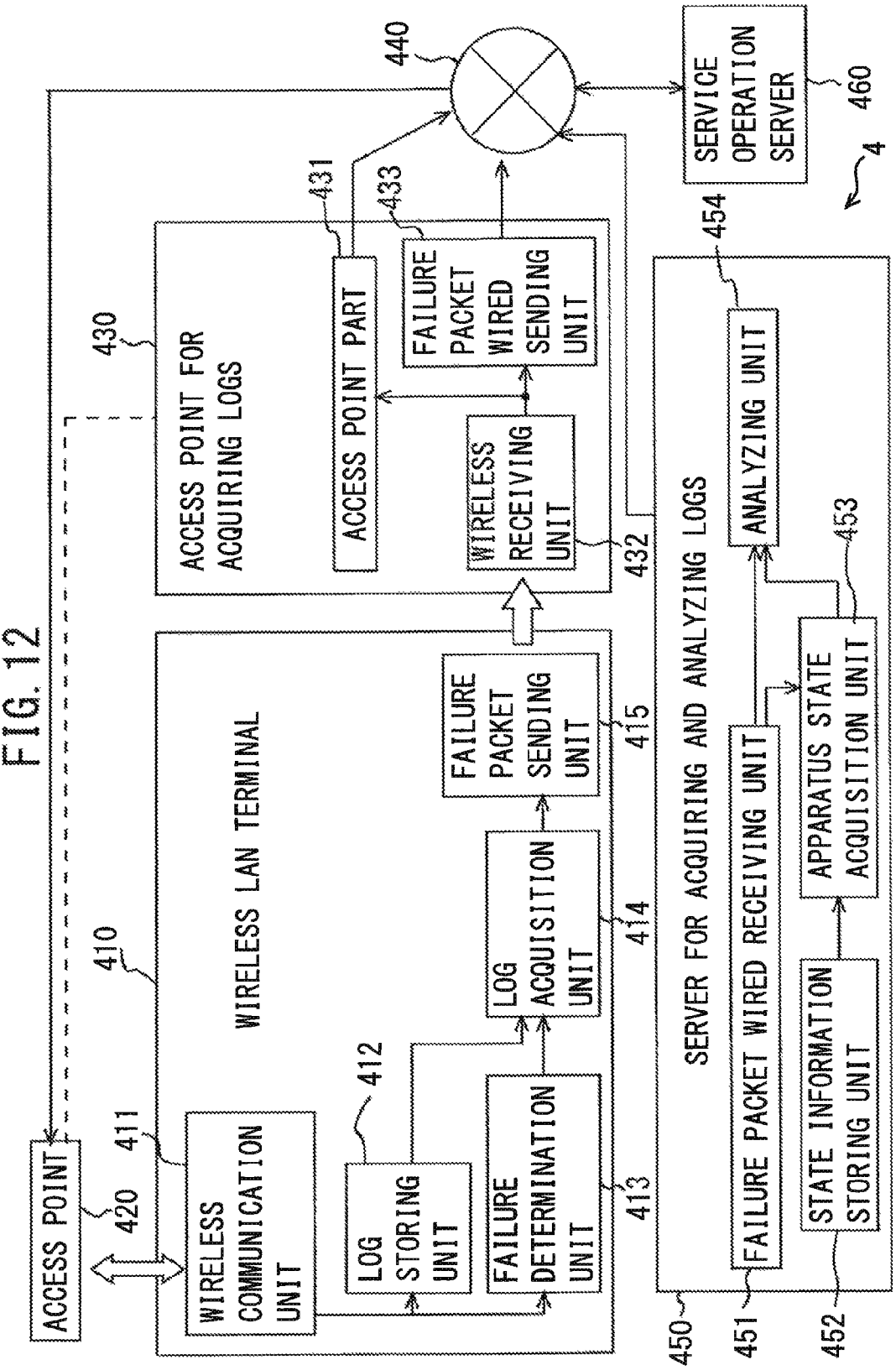
FIG. 12 is a functional block diagram illustrating functions of acquiring, sending and receiving failure information in the wireless LAN system in FIG. 6.

FIG. 12 is a functional block diagram illustrating functions of acquiring, sending and receiving failure information in the wireless LAN system in FIG. 6.

The details of each program part of wireless communication program 5 in FIG. 10 and program for access point for acquiring logs 6 in FIG. 11 are described along with the operation of each functional block in FIG. 12.

As illustrated in FIG. 12, wireless LAN terminal 410 includes as functional block a wireless communication unit 411, a log storing unit 412, a failure determination unit 413, a log acquisition unit 414 and a failure packet sending unit 415.

When wireless LAN terminal 410 executes wireless communication program 5 in FIG. 11, wireless communication part of wireless communication program 5 builds wireless communication unit 411 in FIG. 12. In addition, failure determination part 52 of wireless communication program 5 builds failure determination unit 413 in FIG. 12. Further, log acquisition part of wireless communication program 5 builds log acquisition unit 414 in FIG. 12. Moreover, failure packet sending part 54 of wireless communication program 5 builds failure packet sending unit 415 as illustrated in FIG. 12.

Wireless communication unit 411 designates a nearest access point 420 or access point for acquiring logs 430 as a direct communication correspondent and performs wireless communications with the designated communication correspondent. Hardware devices such as CPU 410*a*, baseband processor 410*f*, transceiver 410*g*, power amplifier 410*h* and antenna 410*i* as illustrated in FIG. 7 function as wireless communication unit 411.

Wireless communication unit 411 corresponds to an example of the wireless communication part which performs wireless communications with a wireless device designated as communication correspondent.

In addition, a wireless communication unit which performs wireless communications with a wireless device designated as communication correspondent is not limited to a unit which designates communication correspondents such as wireless communication unit 411 in the embodiment. The wireless communication unit may be a unit which performs wireless communications with a communication correspondent designated by a device such as a server in a communication network.

Log storing unit 412 stores log information which indicates a communication state at each point of time in wireless communications performed by wireless communication unit 411.

In the present embodiment, log storing unit 412 acquires and stores six types of information as log information as described below.

The first type of the acquired information is a BSSID (Basic Service Set Identifier) which is a hardware-specific address of access point 420 or access point for acquiring logs 430 engaging in communications. The second type thereof is an IP address of service operation server 460. The third type thereof is a RSSI (Receive Signal Strength Indication) value, which represents reception sensitivity during the communication. The forth type thereof is a throughput value which represents a communication rate. The fifth type thereof is a version of driver software (wireless LAN driver) which forms a part of wireless communication part 51 of wireless communication program 5 in FIG. 5. The sixth type thereof is a version of any other application software (wireless LAN application) which forms wireless communication part 51 of wireless communication program 5.

Hardware devices such as CPU 410*a*, HDD 410*c* and baseband processor 410*f* in FIG. 7 function as log storing unit 412. The information acquired by log storing unit 412 is stored in HDD 410*c* which forms log storing unit 412.

Log storing unit 412 corresponds to an example of the state storing part which stores state information which indicates a communication state at each point of time in wireless communications performed by the wireless communication unit as described above. Further, in the present embodiment, the six types of log information correspond to an example of the state information as described above.

Failure determination unit 413 determines whether or not a communication failure occurs at each point of time in wireless communications performed by wireless communication 411 based on a determination criterion for whether or not the throughput value is above a predetermined threshold. Hardware devices such as CPU 410*a* in FIG. 7 function as failure determination unit 413.

Failure determination unit 413 corresponds to an example of the failure determination part which determines whether or not a communication failure occurs at each point of time in wireless communications performed by the wireless communication part based on a predetermined determination criterion.

Log acquisition unit 414 extracts the following log information from log storing unit 412 when the determination result in failure determination unit 413 continues for more than 5 seconds to indicate that a communication failure occurs. That is, log acquisition unit 414 extracts log information which indicates a communication state at each point of time in the time period which starts four seconds before it is determined that the throughput value is not equal to or more than the threshold and ends two seconds after the determination is made. Hardware devices such as CPU 410*a* in FIG. 7 function as log acquisition unit 414.

Log acquisition unit 414 corresponds to an example of the state acquisition part which acquires, when the failure determination unit as described above determines that a communication failure occurs, state information which indicates a communication state at each point of time in a predetermined time period including the point of time which is subject to the determination.

Failure packet sending unit 415 sends a (failure) packet via wireless broadcast communication. The (failure) packet is a packet in which failure information which indicates that a communication failure occurs including log information extracted by log acquisition unit 414 is incorporated into a beacon frame and packetized as described later. First, failure packet sending unit 415 generates failure information which includes the following two pieces of information in addition to the log information as described above. The first additional information is the information which indicates the contents of the failure such as a communication disconnection and an abnormally low throughput. The second additional information is the information which indicates the time when the communication failure occurs in wireless LAN terminal 410 in which the communication failure occurs. Failure packet sending unit 415 generates the two pieces of information based on the log information extracted by log acquisition unit 414.

Failure packet sending unit 415 corresponds to an example of the state sending part which sends the state information acquired by the state acquisition part as described above to at least one communication correspondent including a communication correspondent other than the wireless device as described above.

In addition, in the present embodiment, the two pieces of information as described above are failure information other than the log information. However, peripheral environment information of wireless LAN terminal 410 immediately after the communication failure occurs may be added to the failure information. The peripheral environment information may be acquired by activating a wireless LAN area searching tool and the like immediately after communications are suspended in wireless LAN terminal 410 due to the communication failure and acquiring the peripheral environment information of wireless LAN terminal 410 at the point of time when communication failure occurs.

The peripheral environment information to be acquired includes a network name of any other peripheral wireless LAN (SSID: Service Set Identifier), a BSSID of the peripheral wireless LAN, the signal strength thereof and the like.

In the embodiment, failure packet sending unit 415 incorporates the failure information as described above into a data frame which uses a frame format similar to a frame format used in the following beacon frame and packetizes the data frame.

Explanations are given for the beacon frame below.

Access points 420 and access points for acquiring logs 430 in FIG. 6 include functions of sending and receiving beacon frames which notify the presence of the access points themselves to the external devices. The beacon frame is a data frame in which a variety of information such as SSID of the network to which the access point belongs to is packetized. Further, in the present embodiment, the beacon frame is a data frame which uses a frame format in accordance with IEEE 802.11.

In addition, the failure information as described above is sent via wireless communication as a failure packet in which the failure information is incorporated into a data frame which uses a frame format similar to the frame format of the beacon frame and packetized.

Figure 13:
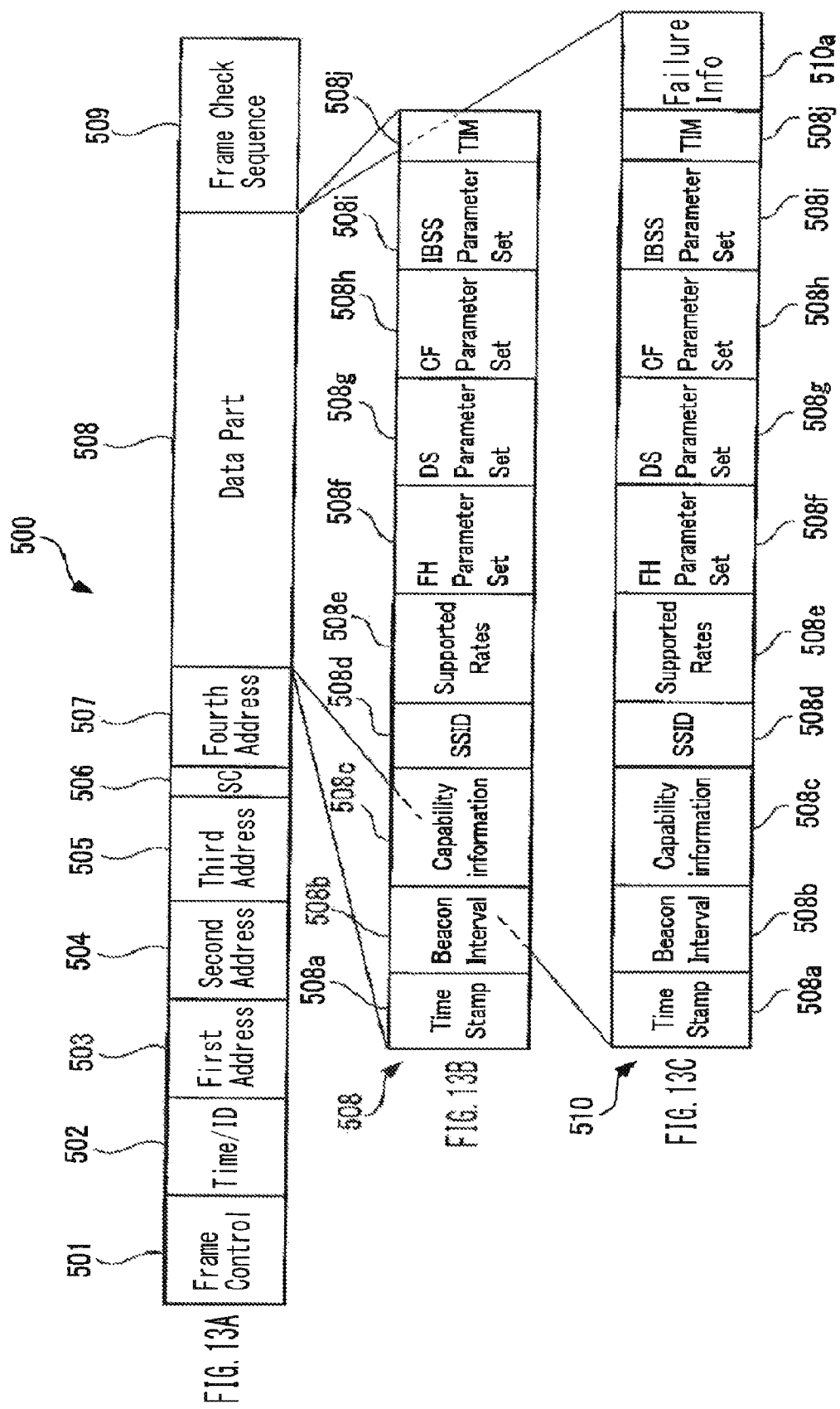
FIGS. 13A, 13B and 13C are schematic diagrams illustrating a beacon frame, a data part in the beacon frame, and a data part of a failure packet, respectively.

FIGS. 13A, 13B and 13C are schematic diagrams illustrating a beacon frame, a data part in the beacon frame, and a data part of a failure packet, respectively.

FIG. 13A illustrates a beacon frame, FIG. 13B illustrates a data part in the beacon frame, and FIG. 13C illustrates a data part of a failure packet.

The frame format of a beacon frame 500 in FIG. 13A is in accordance with IEEE 802.11.

Beacon frame 500 includes a frame control part 501, a time and ID part 502, the first to the third address parts 503 to 505, a sequence control part 506, the forth address part 507, a data part 508 and a frame check sequence part 509.

Information which indicates the type and the like regarding the data frame is stored in frame control part 501. In beacon frame 500, frame control part 501 stores as data frame type the information which indicates a management frame the type of which the beacon frame belongs to.

The information which indicates the time duration for sending the data frame is stored in time and ID part 502.

The MAC address of the destination device is stored in first address part 503. Since beacon frame 500 is sent via wireless broadcast communication, "FFFF," which indicates an unspecified destination device, is stored in first address part 503.

The MAC address of the sending device is stored in second address part 504. In beacon frame 500, the MAC address of the access point itself is stored in second address part 504.

The MAC address or the BSSID of the access point is stored in third address part 505. In beacon frame 500, the BSSID of the access point itself is stored in third address part 505.

The sequence number and the like of the information sent in this data frame is stored in sequence control part 506.

When any address is additionally stored in the data frame, the address is stored in forth address part 507. In beacon frame 500, which is a kind of the management frame, the SSID of the network to which the access point sending the beacon frame belongs is stored in forth address part 507.

Information sent by the data frame is stored in data part 508. In beacon frame 500, the information illustrated in FIG. 13B is stored therein.

Information regarding the error detection is stored in frame check sequence part 509.

In addition, as illustrated in FIG. 13B, data part 508 of beacon frame 500 includes a time stamp part 508a, a beacon interval part 508b, a capability information part 508c, an SSID part 508d and a communication rate part 508e. And, data part 508 includes a FH (Frequency Hopping) parameter part 508f and a DS (Direct Sequence) parameter part 508f. Further, data part 508 includes a CF (Compact Flash) parameter part 508h. Additionally, data part 508 includes an IBSS (Independent Basic Service Set) parameter part 508i. Moreover, data part 508 includes a TIM (Traffic Indication Map) part 508j.

Time stamp part 508a stores the information which indicates the time when an access point sends a beacon. Beacon interval part 508b stores the information which indicates the time interval for sending beacons. Capability information part 508c stores the property information of the beacon. SSID part 508d stores the SSID of the network to which the access point sending the beacon belongs. Communication rate part 508e stores the information which indicates the communication rate of the beacon. FH parameter part 508f stores a variety of parameters which are used when the FH scheme is employed as communication scheme. DS parameter part 508f stores a variety of parameters which are used when the DS scheme is employed as communication scheme. CF parameter part 508h stores a variety of parameters which are used when communications are performed using a CF card. IBSS parameter part 508i stores a variety of parameters which are used when an ad-hoc mode, in which terminals perform wireless communications each other directly, is employed as communication scheme. In communication system 4 in the present embodiment, since wireless communications are performed in the infrastructure mode as described above, the variety of parameters stored in IBSS parameter part 508i are ignored. TIM part 508j stores the information which is identical to the information which indicates the communication interval stored in beacon interval part 508b.

In the embodiment, when a communication failure occurs, a failure packet in which the failure information is attached to the data part which is similar to data part 508 in beacon frame 500 and the data part is packetized is sent via wireless broadcast communication from wireless LAN terminal 410 in which the failure occurs.

Data part 510 of the failure packet includes a data part similar to data part 508 in beacon frame 500.

Here, time stamp part 508a in data part 510 in the failure packet stores information which indicates the time when the failure packet is sent from wireless LAN terminal 410. In addition, beacon interval part 508b in data part 510 stores information which indicates the time interval for sending the failure packet repeatedly. Capability information part 508c stores the property information regarding the information which has been exchanged during the wireless communications related to the failure. SSID part 508d stores the SSID of the network to which the access point belongs. The access point has been performing communications with wireless LAN terminal 410 which sent the failure packet. Communication rate part 508e stores the information which indicates the communication rate of the failure packet. FH parameter part 508f, DS parameter part 508g, CF parameter part 508h and IBSS parameter part 508i stores information similar to data part 508 in beacon frame 500 as described above. TIM part 508j stores information similar to the information stored in beacon interval part 508b in data part 510.

Further, data part 510 of the failure packet includes a failure information storing part 510a for storing the failure information as described above.

Failure packet sending unit 415 in FIG. 12 sends a failure packet including data part 510 via wireless broadcast communication. Hardware devices such as CPU 410a, baseband processor 410f, transceiver 410g, power amplifier 410h and antenna 410i in FIG. 7 function as failure packet sending unit 415.

Moreover, access point for acquiring logs 430 includes an access point unit 431, a wireless receiving unit 432 and a failure packet wired sending unit 433.

When access point for acquiring logs 430 executes program for access point for acquiring logs 6 in FIG. 11, access point part 61 of program for access point for acquiring logs 6 builds access point unit 431 as illustrated in FIG. 12. And wireless receiving part 62 of program for access point for acquiring logs 6 builds wireless receiving unit 432 in FIG. 12. In addition, failure packet wired sending part 63 of program for access point for acquiring logs 6 builds failure packet wired sending unit 433 in FIG. 12.

Access point 431 performs functions of a general access point such as wireless communications with wireless LAN terminals 410, wired communications with backbone network 440 and generation and sending of beacon frames as described above. Hardware devices such as CPU 430a, baseband processor 430h, transceiver 430i, power amplifier 430j and antenna 430k in FIG. 8 function as access point unit 431. Additionally, detailed explanations for the functions of a general access point are omitted here because the functions are well known in the field of wireless LAN.

Wireless receiving unit 432 performs the following processes in addition to receiving processes of a general access point such as processes for receiving a variety of information and beacon frames from wireless LAN terminals 410. Wireless receiving unit 432 determines whether or not the received information is a failure packet which failure packet sending unit 415 in wireless LAN terminal 410 sends via broadcast communication. When wireless receiving unit 432 determines that the received information is a failure packet, wireless receiving unit 432 sends the failure packet to failure packet sending unit 433. On the other hand, when wireless receiving unit 432 determines that the received information is information other than a failure packet such as normal wireless information, a beacon frame and the like, wireless receiving unit 432 sends the information to access point unit 431. Hardware devices such as CPU 430a, baseband processor 430h, transceiver 430i, power amplifier 430j and antenna 430k in FIG. 8 function as wireless receiving unit 432. Wireless receiving unit 432 corresponds to an example of the wireless receiving part which receives the state information sent from the wireless communication apparatus via wireless communication.

In addition, access point 420 also includes access point unit 431 and functional units which perform the general receiving processes in wireless receiving unit 432, which are included in the functional block in access point for acquiring logs 430. However, access point 420 does not include the determination function for the received information as described above. Thus, when access point 420 receives a failure packet, access point 420 discards the packet as meaningless information.

Failure packet wired sending unit 433 in FIG. 12 is connected with server for acquiring and analyzing logs 450 by wired connection via backbone network 440. And when failure packet wired sending unit 433 receives a failure packet from wireless receiving unit 432, failure packet wired sending unit 433 performs the following processes.

First, failure packet wired sending unit 433 extracts the failure information as described above from data part 510 of the failure packet. Next, failure packet wired sending unit 433 incorporates the extracted failure information into a data frame for wired communication as described below and generates a failure packet for wired communication. And then, failure packet wired sending unit 433 sends the generated failure packet for wired communication through backbone network 440 to server for acquiring and analyzing logs 450 via wired communication.

Figure 14:
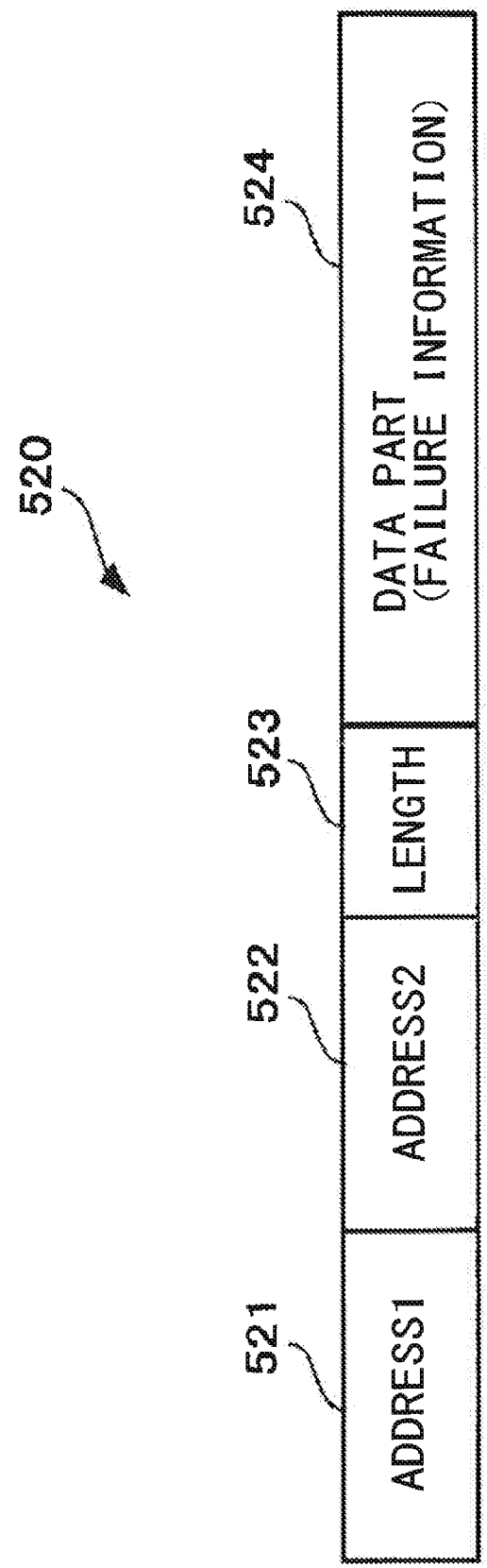
FIG. 14 is a schematic diagram illustrating a data frame for wired communication.

FIG. 14 is a schematic diagram illustrating a data frame for wired communication.

Data frame for wired communication 520 includes a first address part 521, a second address part 522, a packet length part 523 and a data part 524.

First address part 521 stores a MAC address of a receiving device. Thus, first address part 521 stores a MAC address of server for acquiring and analyzing logs 450.

Second address part 522 stores a MAC address of access point for acquiring logs 430, which sends the failure packet for wired communication.

Packet length part 523 stores the information which indicates the packet length of data frame 520.

In addition, data part 524 stores the failure information which is extracted from data part 510 in the failure packet sent from the wireless receiving unit in FIG. 12.

Hardware devices such as CPU 430a, LAN PHY element 430d, MAC element 430e and RJ-45 connector 430f in FIG. 8 function as failure packet wired sending unit 433 as described above. Further, failure packet wired sending unit 433 corresponds to an example of the wired sending part which sends the state information received by the wireless receiving unit via wired communication and which is connected with the analyzing apparatus for receiving and analyzing the state information.

Explanations are given below for processes performed from the time when a communication failure occurs until the time when a failure packet for wired communication is sent to server for acquiring and analyzing logs 450 via wired communication.

Figure 15:
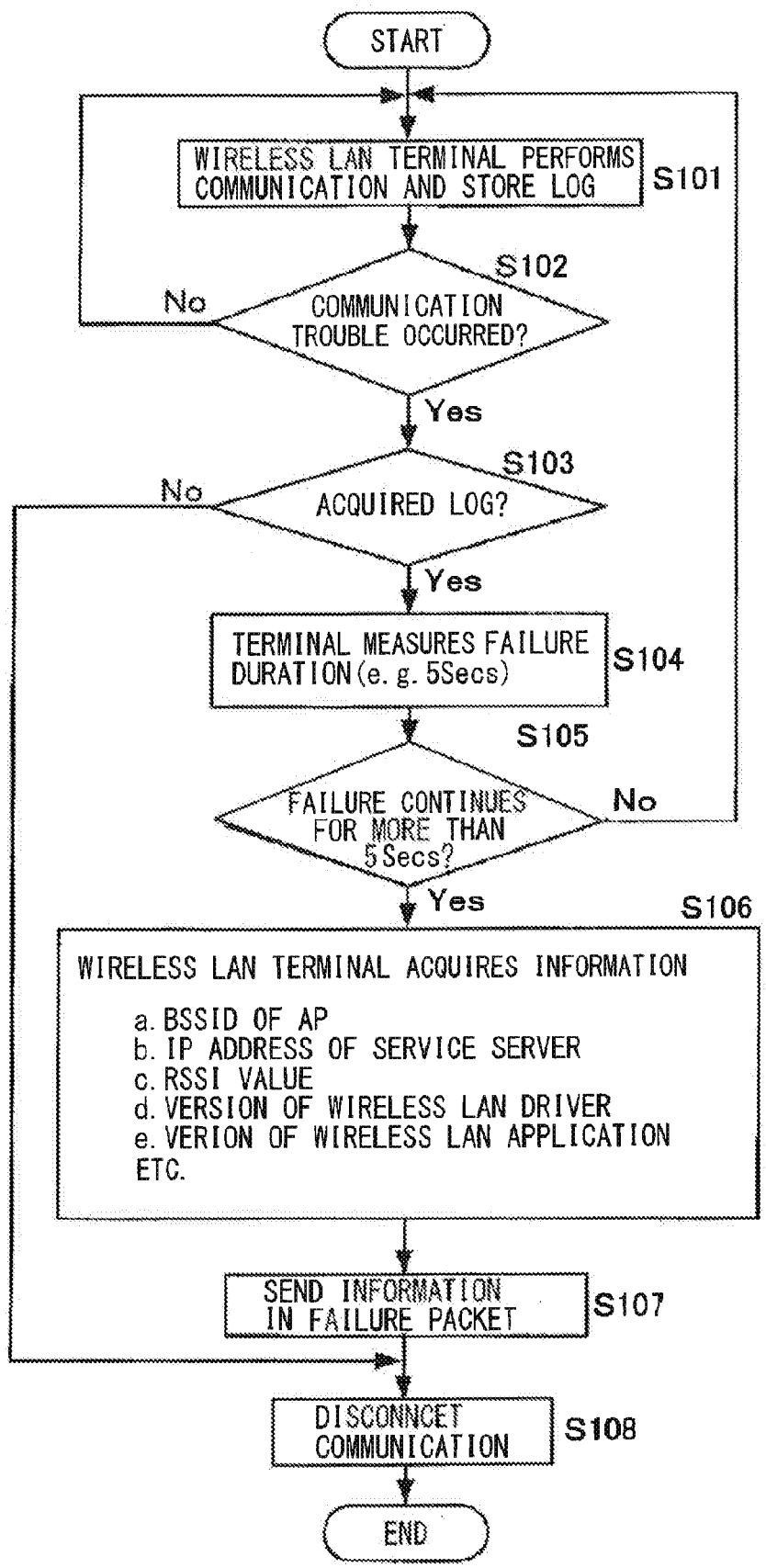
FIG. 15 is a flowchart illustrating a flow of processes which are performed in an access point for acquiring logs.

FIG. 15 is a flowchart illustrating a flow of processes which are performed in an access point for acquiring logs.

In the processes illustrated in the flowchart, while wireless LAN terminal 410 is performing wireless communications, log storing unit 412 in FIG. 12 acquires and stores log information which indicates a communication state at each point of time in the wireless communications (step S101).

Further, failure determination unit 413 in FIG. 12 determines whether or not the throughput value in the log information at each point of time which is stored in step S101 is equal to or higher than a predetermined threshold (step S102).

When it is determined that the throughput value is equal to or higher than the threshold in step S102 (step S102: NO), the process returns to step S101 to acquire and store log information.

On the other hand, when it is determined that the throughput value is lower than the threshold (step S102: YES), log acquisition unit 414 determines whether or not the log information related to the communication failure is extracted and a failure packet is sent (step S103). In the embodiment, user operations set for each wireless LAN terminal 410 whether or not the extraction of log information and the like is executed when a communication failure occurs. In step S103 as described above, it is determined whether or not the execution of the extraction of log information and the like is set.

When it is determined in step S103 that the execution of the extraction of log information and the like is not set (step S103: NO), steps from S104 to S107 are skipped. Then, CPU 410a in wireless LAN terminal 410 blocks the wireless communications (step S108) and the processes illustrated in the flowchart in FIG. 15 are terminated.

On the other hand, when it is determined that the execution of the extraction of log information is set (step S103: YES), failure determination unit 413 performs the following processes (step S104). That is, failure determination unit 413 repeats a determination similar to the determination in step S102 as described above in regard to the throughput value at each point of time during a predetermined time period (5 seconds, for example).

And, after the predetermined time period elapses, failure determination unit 413 determines whether or not it continues to be determined during the period that the throughput value is lower than the threshold.

When it continues to be determined that the throughput value is lower than the threshold (step S105: YES), log acquisition unit 414 extracts the following log information from log storing unit 412 (step S106). That is, log acquisition unit 414 extracts log information at each point of time during the time period of six seconds which starts four seconds before it is determined that the throughput value is not equal to or more than the threshold and ends two seconds after the determination is made. The log information has six types of information as follows. The first information is a BSSID of access point 420 or access point for acquiring logs 430 which is performing communications. The second information is the IP address of service operation server 460. The third information is an RSSI value which indicates reception sensitivity during the communications. The forth information is a throughput value during the communications. The fifth information is a version of a wireless LAN driver. The sixth information is a version of a wireless LAN application.

And then, failure packet sending unit 415 performs the following processes (step S107). First, failure packet sending unit 415 generates failure information which includes, in addition to the log information as described above, two pieces of information which indicate the contents of the failure and the time when the communication failure occurs. And, failure packet sending unit 415 uses the failure information to generate a failure packet which is a data frame including data part 510 as illustrated in FIG. 13C. Further, failure packet sending unit 415 repeatedly sends the generated failure packet via wireless broadcast communication at the time interval which is stored in beacon interval 508b in data part 510. The wireless sending of failure packet continues during a predetermined time period.

Then, CPU 410a in wireless LAN terminal 410 blocks wireless communications (step S108), and the processes in the flowchart in FIG. 15 are terminated.

When wireless LAN terminal 410 sends a failure packet via wireless broadcast communication, access point for acquiring logs 430 in FIG. 12 performs reception of the failure packet and the like.

Figure 16:
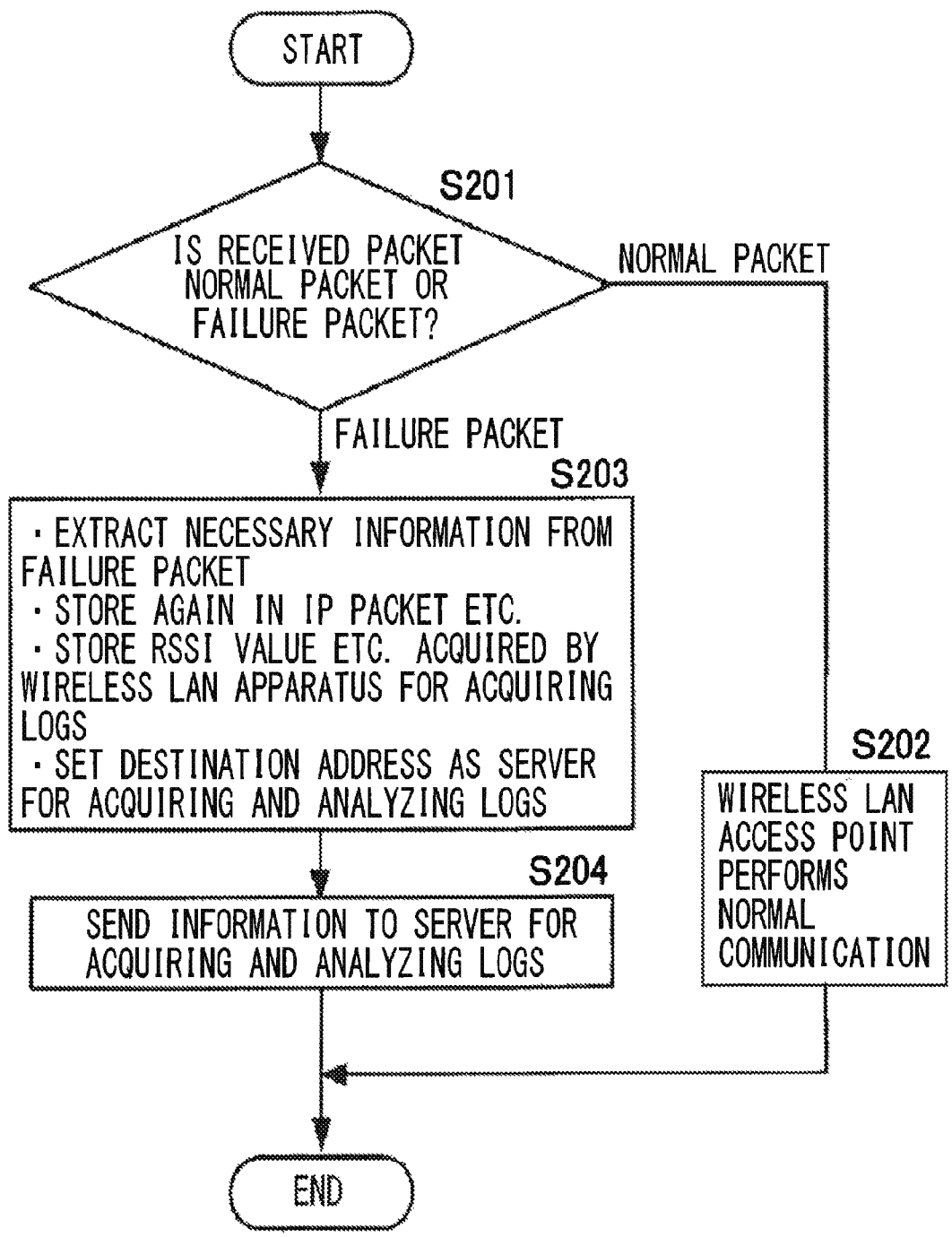
FIG. 16 is a flowchart illustrating a flow of processes which are performed in an access point for acquiring logs.

FIG. 16 is a flowchart illustrating a flow of processes which are performed in an access point for acquiring logs.

In the processes as illustrated in the flowchart, first, wireless receiving unit 432 in FIG. 12 determines that the received information is a failure packet as described above or a normal packet, which is a packet of normal communication or a beacon frame sent from another access point and the like (step S201).

When it is determined that the received information is a normal packet, wireless receiving unit 432 sends the received information to access point unit 431, and access point unit 431 performs processes for normal communications according to the contents of the received information (step S202). And, in this case, when step S202 finishes, the processes as illustrated in the flowchart in FIG. 16 are terminated.

On the other hand, when it is determined that the received information is a failure packet, wireless receiving unit 432 sends the received information to failure packet wired sending unit 433. And, failure packet wired sending unit 433 extracts failure information from data part 510 in the received information (failure packet). Then, failure packet wired sending unit 433 stores the extracted information in data part 524 in data frame for wired communication 520 in FIG. 14 (step S203).

And then, failure packet wired sending unit 433 sends the failure packet for wired communication generated by the processes in step S203 to server for acquiring and analyzing logs 450 through backbone network 440 via wired communication (step S204). In this case, when the wired communication in step S204 finishes, the processes as illustrated in the flowchart in FIG. 16 are terminated.

Further, in the present embodiment, server for acquiring and analyzing logs 450 includes a function of analyzing the failure information sent from access point for acquiring logs 430 which is incorporated into a failure packet for wired communication to identify the cause of failure.

As illustrated in FIG. 12, server for acquiring and analyzing logs 450 includes failure packet wired receiving unit 451, apparatus state storing unit 452, apparatus state acquisition unit 453 and analyzing unit 454 as functional blocks related to the analyzing processes as described above.

Among the functional blocks as described above, apparatus state storing unit 452, apparatus state acquisition unit 453 and analyzing unit 454 are built on server for acquiring and analyzing logs 450 by a well-known analysis program for acquiring and analyzing state information of each apparatus in the network.

Failure packet wired receiving unit 451 receives a failure packet for wired communication sent as described above, extracts failure information from data part 524 of the packet and sends the failure information to analyzing unit 454. Hardware devices such as CPU 450a, LAN PHY element 430d, MAC element 430e and RJ-45 connector 430f in FIG. 9 function as failure packet wired receiving unit 451.

Apparatus state storing unit 452 acquires and stores at a predetermined time interval the state information which indicates the operating state of each apparatus including service operation server 460 and the like, which are connected with backbone network 440 via wired connection.

In the embodiment, apparatus state storing unit 452 pings through backbone network 440 at a predetermined time interval to receive a response from each apparatus in order to confirm that the apparatus normally functions. And then, apparatus state storing unit 452 stores the presence or absence of the response to the ping sent to each apparatus as state information which indicates the operating state of each apparatus. Hardware devices such as CPU 450*a*, LAN PHY element 430*d*, MAC element 430*e*, RJ-45 connector 430*f* and HDD 450*g* in FIG. 9 function as apparatus state storing unit 452. The information acquired by apparatus state storing unit 452 is stored in HDD 450*c* which forms apparatus state storing unit 452.

When a failure packet is sent from access point for acquiring logs 430, apparatus state acquisition unit 453 extracts from apparatus state storing unit 452 information at each point of time during the following time period. The time period corresponds to the six seconds during which the log information is extracted at step S106 in FIG. 15. Hardware devices such as CPU 450*a* in FIG. 9 function as apparatus state storing unit 452.

Analyzing unit 454 performs analyzing processes for comparing the information extracted by apparatus state acquisition unit 453 with the failure information stored in data part 510 in the failure packet sent from access point for acquiring logs 430. Hardware devices such as CPU 450*a* in FIG. 9 function as analyzing unit 454.

FIG. 17 is a diagram a table of an example of an analysis result in an analysis processing unit in FIG. 12.

FIG. 17 illustrates a comparison table Tb which compares failure information with information extracted by apparatus state acquisition unit 453.

In comparison table Tb, reception sensitivities, throughput values, SSIDs and BSSIDs, which are included in the log information in the failure information, and the presence or absence of responses to pings in service operation server 460 are compared at one second interval during the time period which starts four seconds before the time T when a failure occurs and ends two seconds thereafter.

For example, when a maintenance agent receives a notification from a user of wireless LAN terminal 410 that a communication failure occurs, the maintenance agent may access server for acquiring and analyzing logs 450 and display comparison table Tb on the display of a monitor, which is not illustrated here. And, in the example in FIG. 17, the maintenance agent determines the cause of the communication failure as described below from the contents of comparison table Tb.

First, in comparison table Tb in FIG. 17, the throughput value is "0 Mbps" at the time when the failure occurs. This means that communications are blocked at the time T when the failure occurs. In addition, the reception sensitivity abruptly decreases at the time T when the failure occurs. Further, although the SSID is not changed, the BSSID is changed. This means that a roaming occurs to change access points for the communication target.

Thus, the maintenance agent determines that the reception sensitivity decreases immediately after the roaming occurs and the communications are blocked due to the roaming. In addition, there have consistently been responses to the pings in service operation server 460. Therefore, the communication failure is caused by the wireless connection between wireless LAN terminal 410 and the access point. And, the maintenance agent determines as described below because the communication failure also occurs when the roaming occurs. That is, the maintenance agent determines that the communication failure is caused by the access point after the roaming or by an obstacle and the like between wireless LAN terminal 410 and the access point.

FIG. 18 is a diagram illustrating a table of another example which is different from that in FIG. 17 of an analysis result in an analysis processing unit in FIG. 12.

In the example in FIG. 18, the maintenance agent may determine the cause of communication failure from the contents of comparison table Tb as described below.

First, comparison table Tb indicates that the throughput value does not abruptly decrease at the time T when the failure occurs but gradually decreases and falls below a lower limit at the time T when the failure occurs. In addition, since no response to the ping occurs several times in service operation server 460, service operation server 460 or the wired network which reaches service operation server 460 is in an unstable condition. On the other hand, since the reception sensitivity, SSID and BSSID are virtually unchanged, it is determined that the wireless connection between wireless LAN terminal 410 and the access point is in a normal condition. Thus, the maintenance agent determines as follows. That is, the maintenance agent determines that the communication failure occurs due to the decrease of the throughput value because service operation server 460 or the wired network which reaches service operation server 460 is in an unstable condition.

As described above, in communication system 4 in the present embodiment, when a communication failure occurs, log information and the like acquired before and after the failure occurs is automatically collected in wireless LAN terminals 410. And, failure packets into which the failure information is incorporated are sent from wireless LAN terminals 410 via wireless broadcast communication. Here, generally, a packet sent via broadcast communication is received with high probability by a receiver such as an access point and the like, which is installed in many communication systems and includes a broadcast communication function. That is, in communication system 4 in the present embodiment, a failure packet can be sent and received via broadcast communication by any one of access points for acquiring logs 430 in communication system 4. Thus, any one of access points for acquiring logs 430 acquires with high probability failure information which is useful for identifying the cause of communication failure. That is, communication system 4 may acquire the failure information which is useful for identifying the cause of communication failure.

In addition, in communication system 4 in the present embodiment, a failure packet which is sent from wireless LAN terminal 410 via wireless broadcast communication is received by access point for acquiring logs 430 and sent to server for acquiring and analyzing logs 450 via wired communication. Thus, the failure information in the failure packet is sent to server for acquiring and analyzing logs 450 which includes a function of analyzing the failure information. Further, the information is sent to server for acquiring and analyzing logs 450 via wired communication, in which a communication failure occurs with less probability than wireless communication. That is, in communication system 4 in the present embodiment, the failure information which is useful for identifying the cause of communication failure is provided for the analyzing processes in order to identify the cause of communication failure.

This means that a preferable application as described below may be employed in a communication system in the present embodiment. In this application embodiment, a state information receiving apparatus as described above includes a wireless receiving unit and a wired sending unit. The wireless receiving unit receives state information sent from a state sending unit as described above via wireless communication. The wired sending unit sends via wired communication the state information received by the wireless receiving unit. In addition, in the application embodiment, the above communication system includes an analyzing apparatus which includes a wired receiving unit and an analyzing unit. The wired receiving unit receives the state information sent from the wired sending unit which connected with the wired receiving unit. The analyzing unit performs analyzing processes to the state information received by the wired receiving unit.

Access point for acquiring logs 430 in the present embodiment corresponds to an example of the information receiving apparatus in the application embodiment. In addition, wireless receiving unit 432 in the present embodiment corresponds to an example of the wireless receiving unit in the application embodiment. Further, failure packet wired sending unit 433 in the present embodiment corresponds to an example of the wired sending unit in the application embodiment. Moreover, server for acquiring and analyzing logs 450 in the present embodiment corresponds to an example of the analyzing unit in the application embodiment. And, failure packet wired receiving unit 451 in the present embodiment corresponds to an example of the wired receiving unit in the application embodiment. Additionally, analyzing unit 454 in the present embodiment corresponds to an example of the analyzing unit in the application embodiment.

On top of this, in wireless LAN terminals 410 in communication system 4 in the present embodiment, failure information is sent via wireless communication as failure packet which is incorporated into data part 510 in a data frame compliant to wireless broadcast communication. And, in failure packet wired sending unit 433, the failure information in the failure packet is incorporated into data frame for wired communication 520 and sent to server for acquiring and analyzing logs 450. Thus, the processes for sending of the failure information via wireless broadcast communication and sending of the failure information to server for acquiring and analyzing logs 450 via wired communication are smoothly performed.

This means that a preferable application as described below may be further employed in a communication system which includes analyzing server apparatus in the above application embodiment. In this application embodiment, a state sending unit as described above incorporates state information as described above into a first type of data frame and sends the data frame. In addition, in this application embodiment, a wireless receiving unit as described above receives the data frame sent from the state sending unit via wireless communication. Further, in this application embodiment, the wired sending unit incorporates the state information which is incorporated into the data frame received by the wireless receiving unit into a second type of data frame and sends the data frame.

Failure packet sending unit 415 in the present embodiment also corresponds to an example of the state sending unit in this application embodiment. In addition, wireless receiving unit 432 in the present embodiment also corresponds to an example of the wireless receiving unit in this application embodiment. Further, failure packet wired sending unit 433 in the present embodiment also corresponds to the wired sending unit in this application embodiment.

In addition, a data frame which uses a frame format similar to the frame format of beacon frame 500 as described in reference to FIGS. 13A, 13*b* and 13C corresponds to an example of the first type of data frame in this application embodiment. Further, data frame for wired communication 520 in FIG. 14 corresponds to an example of the second type of data frame in this application embodiment.

Moreover, in communication system 4 in the present embodiment, a data frame which uses a frame format similar to the frame format of beacon frame 500 as described above is used as data frame for sending failure information via wireless broadcast communication.

Thus, the cost for building the system may be reduced by using an access point, which originally includes a function of sending and receiving beacon frames and is usually installed in an ordinary wireless LAN system, without adding a new receiving apparatus for broadcast information.

This means that a preferable application as described below can be employed in a communication system in the present embodiment. In this application embodiment, a wired network and plural access points are employed. Each of the plural access points is connected with the above wired network. In addition, each access point is designated as a communication correspondent for a wireless communication unit as described above in a wireless communication apparatus as described above to connect the wired network with the wireless communication apparatus. Further, in this application embodiment, each access point includes a notification sending and receiving unit for sending and receiving via wireless communication beacon frames for notifying the presence of the access point to the external devices. Moreover, in this application embodiment, a state information receiving apparatus as described above functions as at least one of the plural access point. And, in this application embodiment, a state sending unit as described above incorporates state information as described above into a data frame which uses a frame format similar to the frame format of a beacon frame as described above, and sends the data frame via wireless communication.

Backbone network 440 in the present embodiment corresponds to an example of the wired network in this application embodiment. And, access point for acquiring logs 430 in the present embodiment corresponds to an example of the state information receiving apparatus in this application embodiment. In addition, a combination of access point unit 431 and wireless receiving unit 432 in the present embodiment corresponds to an example of the notification sending and receiving unit in this application embodiment. Further, failure packet wired sending unit 433 in the present embodiment corresponds to an example of the state sending unit in this application embodiment.

Moreover, in communication system 4 in the present embodiment, log information is acquired when it continues to be determined for more than a predetermined time period (5 seconds, for example) that a communication failure occurs. Thus, failure information related to a communication failure which is recovered immediately after the failure occurs and therefore does not have any particular impact on the communications is excluded from the target to be sent in a failure packet. Therefore, in communication system 4 in the present embodiment, a failure packet may be efficiently sent via wireless communication.

This means that a preferable application as described below can be employed in a communication system in the present embodiment. In this application embodiment, a state acquisition unit as described above performs the processes as described below when it continues to be determined for more than a predetermined time period that a determination result of a failure determination unit as described above indicates that a communication failure occurs. In this case, the state acquisition unit acquires the state information which indicates a communication state at each point of time during a time period which includes any point of time of the communication which is subject to the determination during the predetermined time period.

Log acquisition unit 414 in the present embodiment corresponds to an example of the state acquisition unit in this application embodiment.

In addition, although in the present embodiment a wireless LAN system is exemplified as a communication system according to an aspect of the embodiment, the communication system is not limited thereto. For example, the communication system in the present embodiment may be a communication system which uses media other than electric waves such as infrared, light and the like. In addition, the communication system in the embodiment is not limited to wireless LAN and may be wireless PAN (Personal Area Network), wireless WAN (Wide Area Network) and the like.

Further, although, in the present embodiment, access point for acquiring logs 430 which also functions as access point is exemplified as an example of the state information receiving apparatus, the state information receiving apparatus in the present embodiment is not limited thereto. The state information receiving apparatus may be an apparatus dedicated to receive failure packets which is employed aside from an apparatus such as an access point and the like, which is usually installed in a communication system.

Moreover, in the present embodiment, a data frame which uses a frame format similar to the frame format of the beacon frame is exemplified as a data frame for sending via wireless broadcast communication. However, the data frame for sending via wireless communication is not limited thereto. The data frame for sending via wireless communication may be a data frame which uses a frame format similar to a frame format used in a management frame which is sent to an unspecified number of communication correspondents via wireless communication.

Additionally, in the present embodiment, BSSIDs, IP addresses of service operation servers, RSSI values, throughput values, versions of wireless LAN drivers, versions of wireless LAN applications, the contents of failures and the times when communication failures occur are exemplified as failure information. However, the failure information is not limited thereto and may be any information to which the following information is added. The failure information may include for example an SSID of any other peripheral wireless LAN, a BSSID of an access point to which the wireless LAN belongs and the signal strength of communications related to the wireless LAN.

Furthermore, in the present embodiment, access point for acquiring logs 430 for sending failure information in a received failure packet to server for acquiring and analyzing logs 450 via wired communication is exemplified as an example of the state information receiving apparatus. However, the state information receiving apparatus in the present embodiment is not limited thereto and may be for example an apparatus for storing the failure information in the received failure packet or the failure packet itself in an internal memory and the like. In this case, a maintenance agent reads out failure information and the like by accessing via the backbone network and uses the failure information for maintenance activities such as analyses and the like.

And, although, in the present embodiment, the presence or absence of a response to a ping is exemplified as the state information which indicates the operating state of each apparatus in the network, the information is not limited thereto. The state information which indicates the operating state of each apparatus in the network may be log information and the like of each apparatus which is stored therein.

Additionally, in the present embodiment, a process for comparing failure information with state information which indicates the operating state of each apparatus in the network is exemplified as an example of the analyzing process for the failure information. However, the analyzing process for the failure information is not limited thereto and may be any general analyzing process for identifying the case of the communication failure.

All examples and conditional language recited herein are intended for pedagogical purposes to aid the reader in understanding the invention and the concepts contributed by the inventor to furthering the art, and are to be construed as being without limitations to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. A communication system, comprising:
   a wireless communication apparatus which comprises:
   a first processor; and
   first memory storing instructions for causing the first processor to execute:
      performing wireless communication with a designated wireless apparatus as a communication correspondent;
      storing state information which indicates a communication state at each point of time during the wireless communication;
      using a predetermined determination criterion to the stored state information at each point of time during the wireless communication to determine at each point of time during the wireless communication whether or not a communication failure occurs in the wireless communication;
      acquiring, when it is determined that a communication failure occurs, state information which indicates a communication state at each point of time during a first predetermined time period which includes a point of time during the wireless communication which is subject to the determination; and
      sending via wireless communication the acquired state information to at least one communication correspondent which includes a communication correspondent other than the designated wireless apparatus;
   a state information receiving apparatus which comprises:
   a second processor; and
   second memory storing instructions for causing the second processor to execute:
      receiving the state information via wireless communication;
      receiving information sent from the wireless communication apparatus via wireless communication;
      determining whether or not the received information includes the state information; and sending the state information via wired communication when it is determined that the received information includes the state information; and an analyzing apparatus which comprises:
a third processor; and
third memory storing instructions for causing the third processor to execute:
receiving the state information sent from the state information receiving apparatus; and
analyzing the state information sent from the state information receiving apparatus.

2. The communication system according to claim 1, wherein the first processor further executes:
incorporating the state information into a first type of data frame; and
sending the first type of data frame, and the second processor further executes:
receiving the first type of data frame sent via wireless communication;
incorporating the state information incorporated in the first type of data frame sent via wireless communication into a second type of data frame; and
sending the second type of data frame.

3. The communication system according to claim 1, further comprising:
a wired network; and
a plurality of access points each of which is connected with the wired network via wired connection and at least one of the plurality of access points is designated as a communication correspondent for the wireless communication apparatus to connect the wired network and the wireless communication apparatus, wherein
each access point comprises:
a fourth processor; and
fourth memory storing instructions for causing the fourth processor to execute:
sending and receiving via wireless communication a beacon frame which notifies presence of the access point to an external device,
the state information receiving apparatus also functions as at least one of the plurality of access points, and
the first processor further executes:
incorporating the state information into a data frame which uses a frame format used in the beacon frame; and
sending the data frame via wireless communication.

4. The communication system according to claim 1, wherein,
when it is determined for a second predetermined time period that a communication failure occurs, the first processor further executes acquiring state information which indicates a communication state at each point of time during the wireless communication which includes a point of time during the second predetermined time period which is subject to the determination.

5. A state information receiving apparatus, comprising:
a first processor; and
first memory storing instructions for causing the first processor to execute:
receiving state information sent via wireless communication from a wireless communication apparatus which performs wireless communication with a designated wireless apparatus as a communication correspondent, uses a predetermined determination criterion to stored state information at each point of time during the wireless communication to determine at each point of time during the wireless communication whether or not a communication failure occurs in the wireless communication, and sends, when the determination result indicates that a communication failure occurs, state information which indicates a communication state at each point of time during a predetermined time period which includes a point of time during the wireless communication which is subject to the determination to at least one communication correspondent which includes a communication correspondent other than the designated wireless apparatus;
determining whether or not information sent from the wireless communication apparatus includes the state information; and
sending via wired communication the state information and be connected with an analyzing apparatus which receives and analyzes the sent state information,
wherein the state information receiving apparatus is connected with an analyzing apparatus which receives and analyzes the sent state information, and
the first processor further executes sending the state information via wired communication when it is determined that the information sent from the wireless communication apparatus includes the state information.

6. The state information receiving apparatus according to claim 5, wherein
the wireless communication apparatus incorporates the state information into a first type of data frame and sends the first type of data frame,
the first processor further executes:
receiving the first type of data frame sent via wireless communication;
incorporating the state information which is incorporated into the first type of data frame into a second type of data frame; and
sending the second type of data frame.

7. The state information receiving apparatus according to claim 5, wherein
the state information receiving apparatus also functions as at least one of a plurality of access points each of which is connected with a wired network via wired connection, at least one of the plurality of access points is designated as a communication correspondent for the wireless communication apparatus to connect the wired network and the wireless communication apparatus and sends and receives via wireless communication a beacon frame which notifies presence of the access point to an external device, the wireless communication apparatus incorporates the state information into a data frame which uses a frame format used in the beacon frame, and the state information receiving apparatus receives the data frame sent from the wireless communication apparatus via wireless communication.

8. A non-transitory computer-readable recording medium having stored therein a program for causing a computer to execute a process comprising:
storing state information which indicates a communication state at each point of time during wireless communication;
receiving the state information sent via wireless communication from a wireless communication apparatus which performs wireless communication with a designated wireless apparatus as a communication correspondent, uses a predetermined determination criterion to the state information at each point of time during the wireless communication to determine at each point of time during the wireless communication whether or not a communication failure occurs in the wireless communication, and sends, when the determination result indicates that a communication failure occurs, state information which indicates a communication state at each point of time during a predetermined time period which includes a point of time during the wireless communication which is subject to the determination to at least one communication correspondent which includes a communication correspondent other than the designated wireless apparatus, wherein the receiving receives information sent from the wireless communication apparatus and determines whether or not the received information includes the state information; and sending via wired communication the state information, wherein the sending sends the state information via wired communication when it is determined that the received information includes the state information.

* * * * *